US012509926B2

(12) United States Patent
Choi

(10) Patent No.: US 12,509,926 B2
(45) Date of Patent: Dec. 30, 2025

(54) VEHICLE DOOR OPENING AND CLOSING APPARATUS

(71) Applicants: Hyundai Motor Company, Seoul (KR); Kia Corporation, Seoul (KR)

(72) Inventor: Je Won Choi, Anyang-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 296 days.

(21) Appl. No.: 17/947,694

(22) Filed: Sep. 19, 2022

(65) Prior Publication Data

US 2023/0340809 A1 Oct. 26, 2023

(30) Foreign Application Priority Data

Apr. 22, 2022 (KR) ........................ 10-2022-0050243

(51) Int. Cl.

*E05B 83/40* (2014.01)
*E05B 85/04* (2014.01)
*E05B 85/24* (2014.01)
*E05B 85/26* (2014.01)

(52) U.S. Cl.

CPC ............ *E05B 83/40* (2013.01); *E05B 85/045* (2013.01); *E05B 85/243* (2013.01); *E05B 85/26* (2013.01)

(58) Field of Classification Search

CPC ...... E05B 83/40; E05B 85/045; E05B 85/243; E05B 85/26

See application file for complete search history.

(56) References Cited

U.S. PATENT DOCUMENTS

| | | | | |
|---|---|---|---|---|
| 11,643,844 B2 * | 5/2023 | Megidesh | E05C 3/34 70/278.7 |
| 11,781,367 B2 * | 10/2023 | Choi | E05F 15/619 49/362 |
| 2002/0027375 A1 * | 3/2002 | Wattebled | E05B 83/40 296/146.1 |
| 2014/0292022 A1 * | 10/2014 | Maruyama | B60J 5/047 296/155 |
| 2016/0010364 A1 * | 1/2016 | Hanaki | E05B 83/40 292/201 |
| 2016/0145928 A1 * | 5/2016 | Shimizu | E05B 77/32 292/201 |
| 2018/0044950 A1 * | 2/2018 | Distefano | E05B 85/26 |
| 2020/0399938 A1 * | 12/2020 | Min | E05B 83/38 |
| 2021/0140215 A1 | 5/2021 | Choi | |
| 2021/0170839 A1 * | 6/2021 | Choi | E05B 85/10 |
| 2023/0340808 A1 * | 10/2023 | Choi | E05B 83/40 |

FOREIGN PATENT DOCUMENTS

KR 20210057616 A 5/2021

* cited by examiner

*Primary Examiner* — Mark A Williams
(74) *Attorney, Agent, or Firm* — SLATER MATSIL, LLP

(57) ABSTRACT

An embodiment is a vehicle door opening and closing apparatus, including a main latch mounted on a vehicle door and a main striker mounted on a vehicle body. The main latch of the vehicle door opening and closing apparatus further including a catch configured to rotate around a catch shaft. The main striker including a rod, wherein a contact portion between the catch and the rod is configured to slide when the vehicle door is closed.

18 Claims, 36 Drawing Sheets

VEHICLE DOOR OPENING AND CLOSING APPARATUS

CROSS-REFERENCE TO RELATED APPLICATIONS

This application is based on and claims the benefit of priority to Korean Patent Application No. 10-2022-0050243, filed on Apr. 22, 2022, in the Korean Intellectual Property Office, the disclosure of which is incorporated herein in its entirety by reference.

TECHNICAL FIELD

The present disclosure relates to a vehicle door opening and closing apparatus.

BACKGROUND

Vehicles have door apertures for ingress and egress of passengers to and from a passenger compartment. A vehicle door is closed to cover the door aperture and is opened to enable ingress and egress of passengers to and from the passenger compartment through the door aperture. Vehicle doors are divided into swing doors and sliding doors. The swing door is opened and closed by swinging around a hinge mounted between the swing door and the vehicle body. The sliding door is opened and closed by sliding a roller mounted on the sliding door along a rail mounted on the vehicle body.

The swing door is very easy to open and close, thereby enabling quick ingress and egress of passengers. However, when the swing door is opened, a space for ingress and egress is relatively small. When the vehicle is located in a narrow space, a swing trajectory of the door is not secured, which makes the opening and closing operation thereof difficult.

The sliding door is very easy to open and close even when the vehicle is located in a narrow space. When the sliding door is opened, a space for ingress and egress is relatively large. However, the sliding door requires relatively much force and time to open and close, which hinders quick ingress and egress of passengers.

According to the related art, as a vehicle door is operated by a single opening and closing method, it may be difficult to adequately respond to the needs of users seeking ease of use, diversity, and novelty.

The above information described in this background section is provided to assist in understanding the background of the embodiments of the invention, and may include technical concepts that do not form the prior art that is already known to a person of ordinary skill in the art.

SUMMARY

The present disclosure relates to a vehicle door opening and closing apparatus allowing a vehicle door to open and close in any one mode selected from a swing mode and a sliding mode. More particularly, the present disclosure relates to a vehicle door opening and closing apparatus allowing a vehicle door to be stably closed in any one mode selected from a swing mode and a sliding mode by allowing a contact portion between a catch of a main latch and a rod of a main striker to slide when the vehicle door is closed.

The present disclosure has been made to solve the above-mentioned problems occurring in the prior art while advantages achieved by the prior art are maintained intact.

An aspect of the present disclosure provides a vehicle door opening and closing apparatus allowing a vehicle door to be stably closed in any one mode selected from a swing mode and a sliding mode by allowing a contact portion between a catch of a main latch and a rod of a main striker to slide when the vehicle door is closed.

According to an aspect of the present disclosure, a vehicle door opening and closing apparatus may include a main latch including a catch rotating around a catch shaft, and a main striker including a rod. A contact portion between the catch and the rod may be configured to slide when a vehicle door is closed.

The vehicle door may be selectively opened and closed in any one mode of a sliding mode and a swing mode.

The catch may move along a longitudinal axis of the catch shaft.

The catch shaft may have a first end portion facing a vehicle body and a second end portion facing the interior of the vehicle door. The catch may be biased toward the first end portion of the catch shaft by a spring.

The catch shaft may have a support wall spaced apart from the catch, and the spring may be disposed between the catch and the support wall.

The main latch may further include a pawl operatively connected to the catch, and the pawl may have a width corresponding to a moving distance of the catch.

The catch may continuously contact the pawl while the catch is moving.

The pawl may rotate around a pawl shaft, and a longitudinal axis of the pawl shaft may be parallel to a longitudinal axis of the catch shaft.

The main latch may further include a pawl stopper operatively connected to the pawl. The pawl may have a recess, and the pawl stopper may have a pin received in the recess of the pawl.

The recess of the pawl may extend in a longitudinal direction of the pawl shaft.

The pawl stopper may rotate around the pawl shaft.

The main striker may further include a mounting plate mounted on a vehicle body, and a sleeve moving along a longitudinal axis of the rod. The rod may extend from the mounting plate.

The sleeve may be biased toward a position away from the mounting plate by a spring.

The rod may include two leg portions, and a bridge portion connecting the two leg portions. The sleeve may be movably mounted on any one leg portion of the two leg portions.

The sleeve may rotate around the leg portion.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION OF ILLUSTRATIVE EMBODIMENTS

Figure 1:
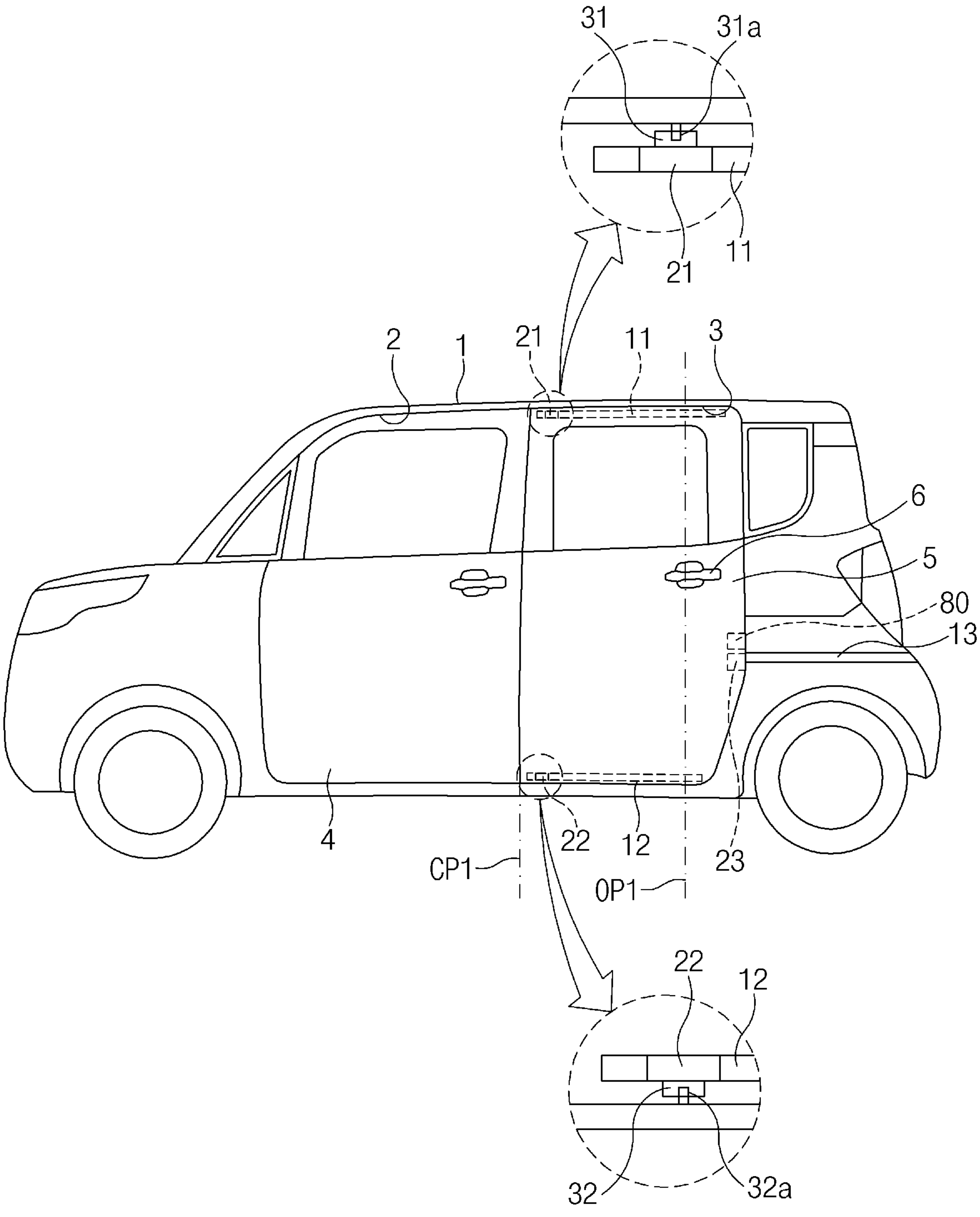
FIG. 1 illustrates a vehicle door opening and closing apparatus according to an exemplary embodiment of the present disclosure, which is mounted on a rear door of a vehicle.

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with the present disclosure will be ruled out in order not to unnecessarily obscure the gist of the present disclosure.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

A vehicle door opening and closing apparatus, according to exemplary embodiments of the present disclosure, may allow a vehicle door to open and close selectively in any one mode of a sliding mode and a swing mode. In other words, the vehicle door opening and closing apparatus, according to exemplary embodiments of the present disclosure, may be a transform-type door opening and closing apparatus. The sliding mode may allow the vehicle door to open and close by sliding in a longitudinal direction of a vehicle, and the swing mode may allow the vehicle door to open and close by swinging inwards and outwards.

Referring to FIG. 1, a vehicle body 1 may have a plurality of door apertures 2 and 3, and the plurality of door apertures 2 and 3 may be divided into a front aperture 2 and a rear aperture 3. A plurality of vehicle doors 4 and 5 may include a front door 4 covering and uncovering the front aperture 2, and a rear door 5 covering and uncovering the rear aperture 3. As the front door 4 is opened, the front door 4 may uncover the front aperture 2, and as the front door 4 is closed, the front door 4 may cover the front aperture 2. As the rear door 5 is opened, the rear door 5 may uncover the rear aperture 3, and as the rear door 5 is closed, the rear door 5 may cover the rear aperture 3.

The vehicle door opening and closing apparatus, according to exemplary embodiments of the present disclosure, may be applied to the front door 4, the rear door 5, and the like. FIGS. 1 to 4 illustrate a vehicle door opening and closing apparatus according to exemplary embodiments of the present disclosure, which is applied to the rear door 5. Hereinafter, the rear door 5 will be referred to as the vehicle door 5, and the rear aperture 3 will be referred to as the door aperture 3.

The vehicle door opening and closing apparatus, according to exemplary embodiments of the present disclosure, may include one or more rails 11 and 12 mounted on the vehicle body 1, and the rails 11 and 12 may extend in the longitudinal direction of the vehicle. Referring to FIG. 1, an upper rail 11 may be mounted on an upper edge of the vehicle body 1, and a lower rail 12 may be mounted on a lower edge of the vehicle body 1. The upper rail 11 and the lower rail 12 may extend in the longitudinal direction of the vehicle. The upper rail 11 may be disposed on an upper edge of the door aperture 3, and the lower rail 12 may be disposed on a lower edge of the door aperture 3.

The vehicle door opening and closing apparatus, according to exemplary embodiments of the present disclosure, may include roller units 21 and 22 guided along the rails 11 and 12. The roller units 21 and 22 may allow the vehicle door 5 to open and close in one mode selected from the sliding mode and the swing mode. In particular, the roller units 21 and 22 may be releasably held in predetermined positions of the rails 11 and 12 by hold locks 31 and 32. Specifically, when the roller units 21 and 22 are held in the predetermined positions of the rails 11 and 12 by the hold locks 31 and 32, the vehicle door 5 may be opened and closed in the swing mode in which the vehicle door swings in the predetermined positions of the rails 11 and 12. When the roller units 21 and 22 are released by the hold locks 31 and 32, the vehicle door 5 may be opened and closed in the sliding mode in which the vehicle door slides along the rails 11 and 12.

The vehicle door opening and closing apparatus, according to exemplary embodiments of the present disclosure, may further include the center rail 13 mounted on a central portion of the vehicle, and a center roller unit 23 guided along the center rail 13.

Figure 3:
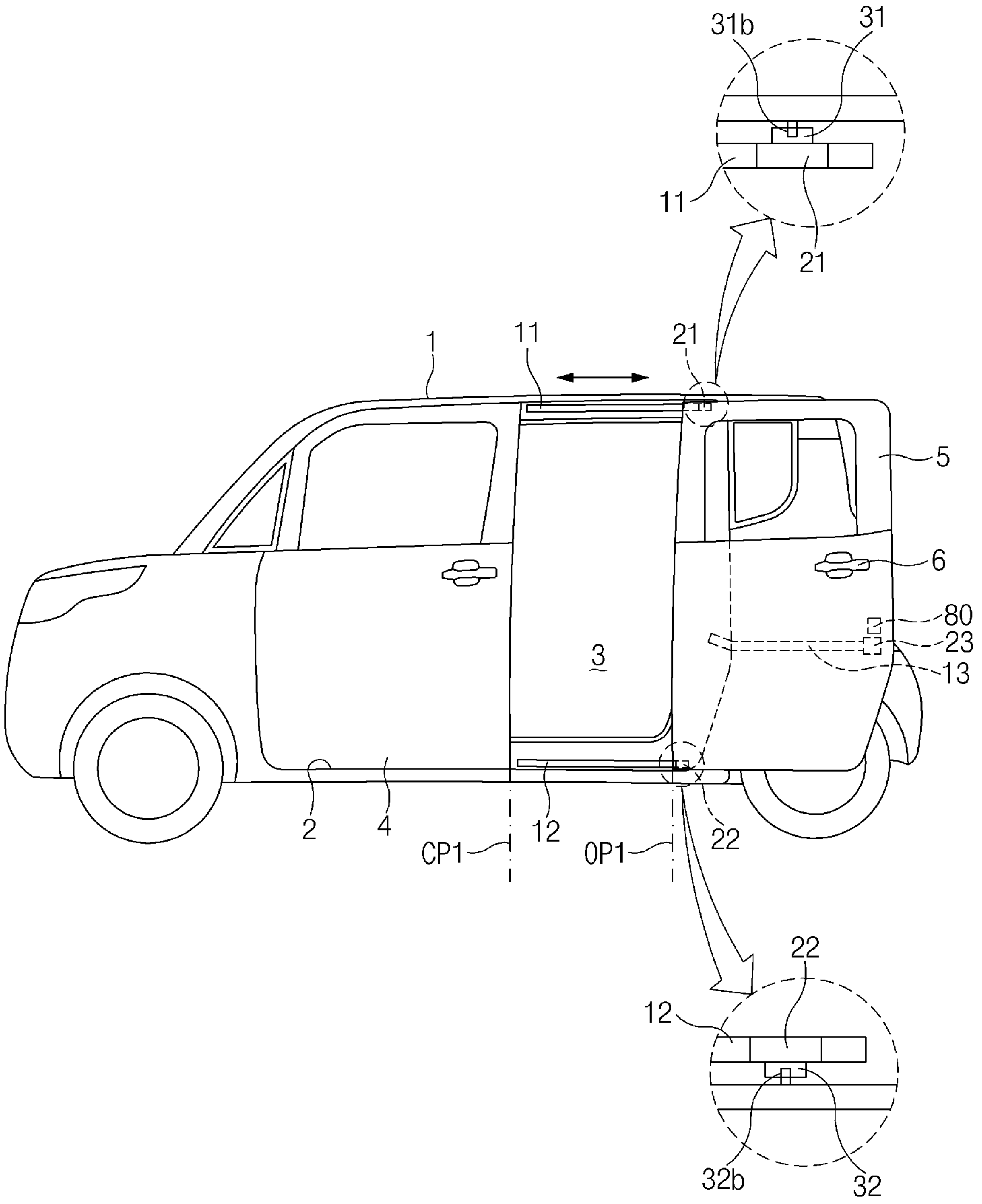
FIG. 3 illustrates a state in which the door of FIG. 1 is opened in a sliding mode.

Referring to FIGS. 1 and 3, the upper roller unit 21 may be mounted on an upper end of the vehicle door 5, and the upper roller unit 21 may slide along the upper rail 11. The lower roller unit 22 may be mounted on a lower end of the vehicle door 5, and the lower roller unit 22 may slide along the lower rail 12.

Figure 2:
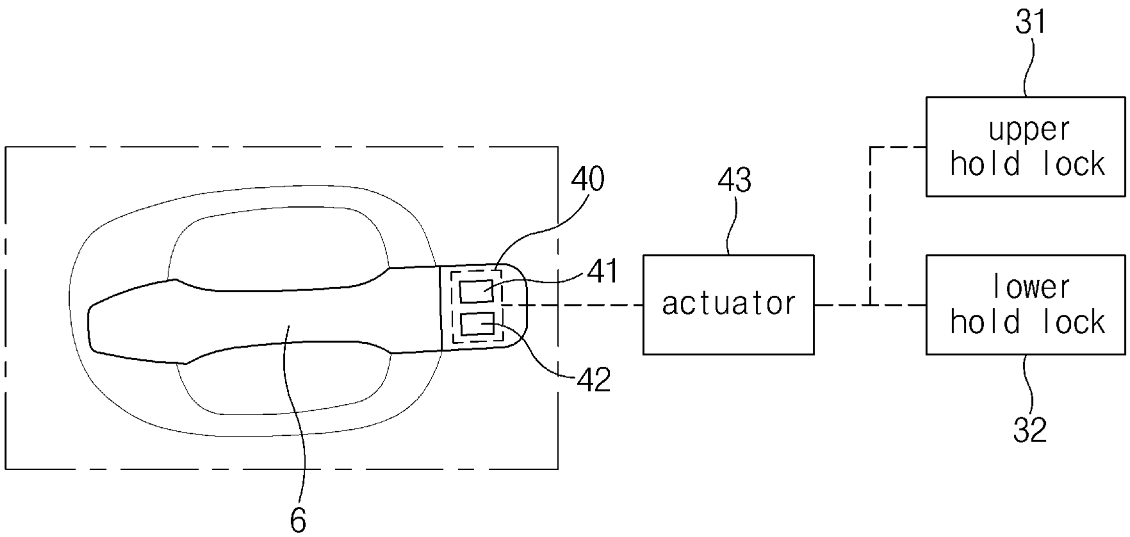
FIG. 2 illustrates a selector adjacent to an outside handle of a vehicle, an actuator connected to the selector, and hold locks.

Referring to FIG. 2, the vehicle door 5 may include an outside handle 6, and a selector 40 for selecting the sliding mode and the swing mode may be disposed on the outside handle 6 or a portion of the vehicle door adjacent to the outside handle 6. The selector 40 may have a first switch 41 selecting the sliding mode, and a second switch 42 selecting the swing mode.

When a user presses the first switch 41 and the sliding mode is selected, the vehicle door 5 may slide along the upper rail 11, the lower rail 12, and a center rail 13 as illustrated in FIG. 3 as the user pushes the outside handle 6 toward the front of the vehicle or pulls the outside handle 6 toward the rear of the vehicle. In the sliding mode, the vehicle door 5 may move between a first open position OP1 in which the vehicle door 5 is fully opened and a first closed position CP1 in which the vehicle door 5 is fully closed, as illustrated in FIGS. 1 and 3.

Figure 4:
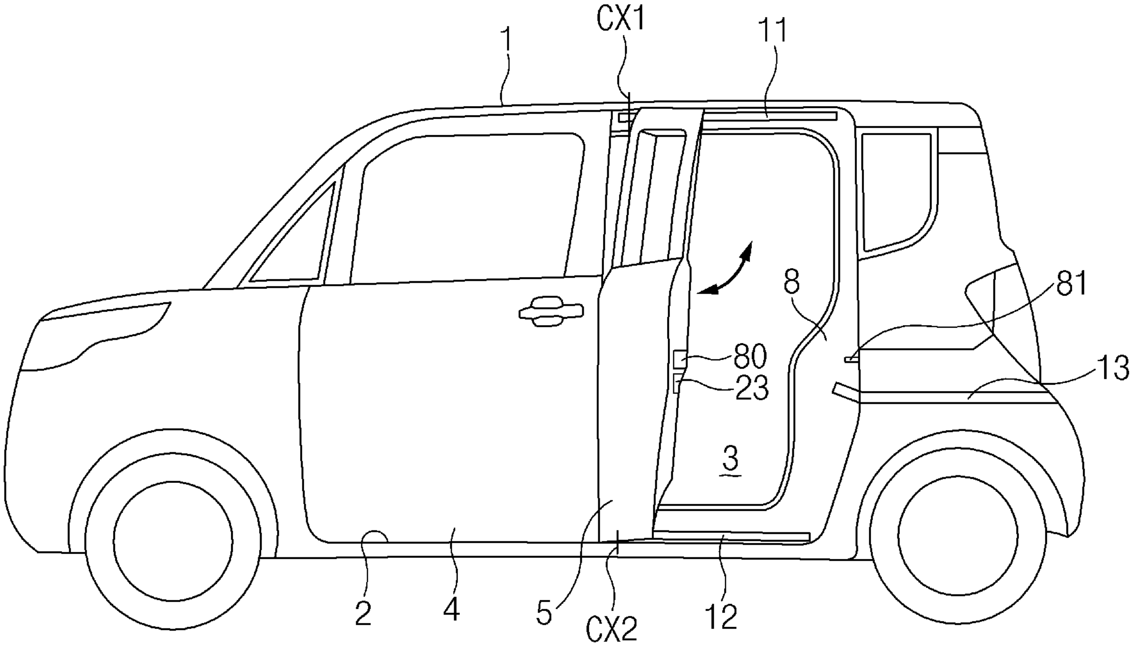
FIG. 4 illustrates a state in which the door of FIG. 1 is opened in a swing mode.
Figure 6:
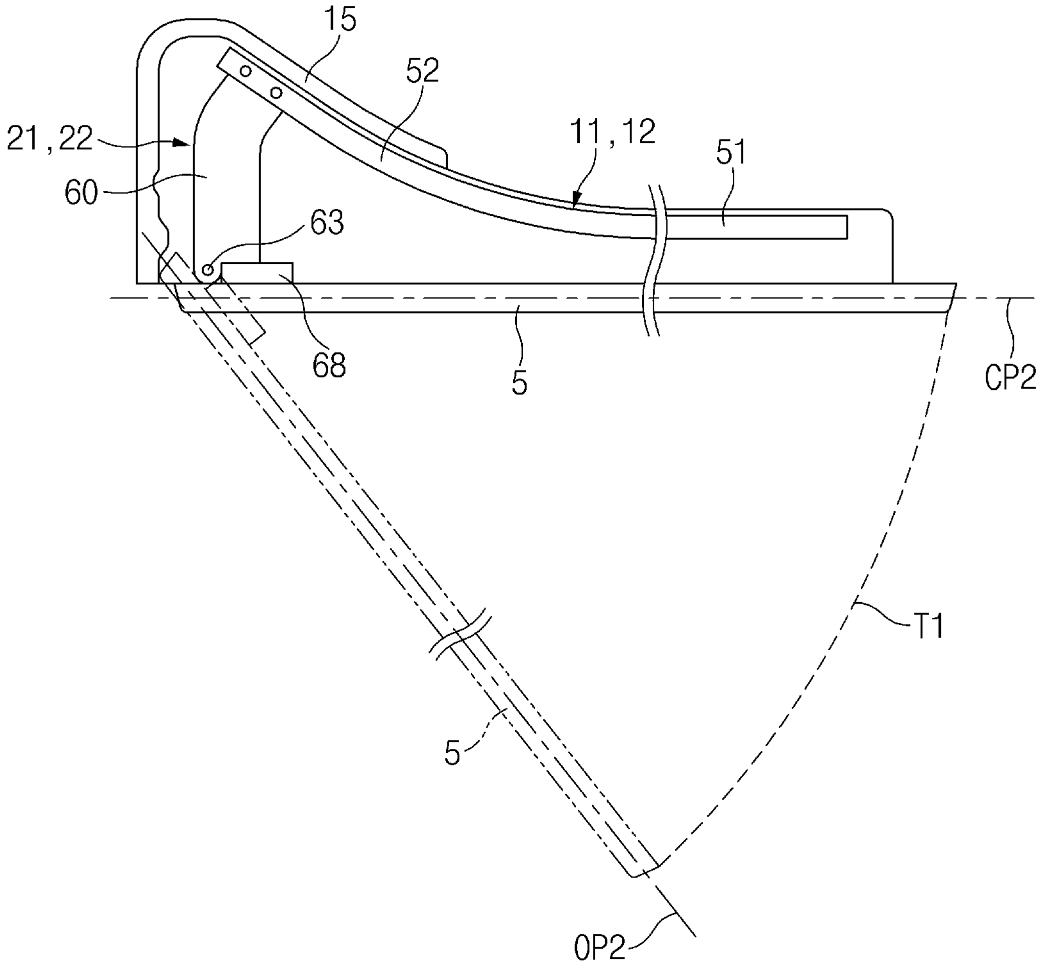
FIG. 6 illustrates a state in which a vehicle door pivots by an upper roller unit and a lower roller unit when the vehicle door is opened and closed in a swing mode in a vehicle door opening and closing apparatus according to an exemplary embodiment of the present disclosure.

When the user presses the second switch 42 and the swing mode is selected, the vehicle door 5 may swing as illustrated in FIG. 4 as the user pushes or pulls the outside handle 6 toward a passenger compartment of the vehicle or toward the exterior of the vehicle. In the swing mode, the vehicle door 5 may move between a second open position OP2 in which the vehicle door 5 is fully opened and a second closed position CP2 in which the vehicle door 5 is fully closed, as illustrated in FIG. 6. The vehicle door 5 swings from the second closed position CP2 to the second open position OP2 along a swing trajectory T1. In particular, when the vehicle door 5 is held in the first closed position CP1, the swing mode may be operated.

The upper roller unit 21 may have an upper hold lock 31, and the vehicle body 1 may have a first upper striker 31*a* and a second upper striker 31*b* protruding downwardly from a top portion of the vehicle body 1. The first upper striker 31*a* may be aligned with or adjacent to a virtual axis of the first closed position CP1, and the second upper striker 31*b* may be aligned with or adjacent to a virtual axis of the first open position OP1.

According to an exemplary embodiment, as illustrated in FIGS. 1 and 3, the upper hold lock 31 may releasably hold the first upper striker 31*a* in the first closed position CP1, and releasably hold the second upper striker 31*b* in the first open position OP1. That is, one upper hold lock 31 may selectively hold the first upper striker 31*a* and the second upper striker 31*b*. As the upper hold lock 31 holds the first upper striker 31*a*, the upper roller unit 21 may be firmly held in the first closed position CP1 so that the vehicle door 5 may be kept in the first closed position CP1. As the upper hold lock 31 holds the second upper striker 31*b*, the upper roller unit 21 may be firmly held in the first open position OP1 so that the vehicle door 5 may be kept in the first open position OP1.

According to another exemplary embodiment, the upper hold lock 31 may releasably hold the first upper striker 31*a* in the first closed position CP1 so that the vehicle door 5 may be kept in the first closed position CP1. That is, the upper hold lock 31 may be an upper closed hold lock which keeps the closed state of the vehicle door 5 in the first closed position CP1. An upper open hold lock (not shown) may be mounted on the upper roller unit 21, and the upper open hold lock may releasably hold the second upper striker 31*b* in the first open position OP1. That is, the upper closed hold lock, which releasably holds the first upper striker 31*a* in the first closed position CP1, and the upper open hold lock, which releasably holds the second upper striker 31*b* in the first open position OP1, may be individually mounted on the upper roller unit 21.

Referring to FIG. 4, the upper roller unit 21 may have an upper rotation axis CX1, and the vehicle door 5 may rotate around the upper rotation axis CX1. When the upper roller unit 21 is firmly held in the first closed position CP1 by the upper hold lock 31 and the first upper striker 31*a*, the vehicle door 5 may rotate around the upper rotation axis CX1.

The lower roller unit 22 may have a lower hold lock 32, and the vehicle body 1 may have a first lower striker 32*a* and a second lower striker 32*b* protruding upwardly from a floor of the vehicle body 1. The first lower striker 32*a* may be aligned with or adjacent to the virtual axis of the first closed position CP1, and the second lower striker 32*b* may be aligned with or adjacent to the virtual axis of the first open position OP1.

According to an exemplary embodiment, as illustrated in FIGS. 1 and 3, the lower hold lock 32 may releasably hold the first lower striker 32*a* in the first closed position CP1, and releasably hold the second lower striker 32*b* in the first open position OP1. That is, one lower hold lock 32 may selectively hold the first lower striker 32*a* and the second lower striker 32*b*. As the lower hold lock 32 holds the first lower striker 32*a*, the lower roller unit 22 may be firmly held in the first closed position CP1 so that the vehicle door 5 may be kept in the first closed position CP1. As the lower hold lock 32 holds the second lower striker 32*b*, the lower roller unit 22 may be firmly held in the first open position OP1 so that the vehicle door 5 may be kept in the first open position OP1.

According to another exemplary embodiment, the lower hold lock 32 may releasably hold the first lower striker 32*a* in the first closed position CP1 so that the vehicle door 5 may be kept in the first closed position CP1. That is, the lower hold lock 32 may be a lower closed hold lock which keeps the closed state of the vehicle door 5 in the first closed position CP1. A lower open hold lock (not shown) may be mounted on the lower roller unit 22, and the lower open hold lock may releasably hold the second lower striker 32*b* in the first open position OP1. That is, the lower closed hold lock, which releasably holds the first lower striker 32*a* in the first closed position CP1, and the lower open hold lock, which releasably holds the second lower striker 32*b* in the first open position OP1, may be individually mounted on the lower roller unit 22.

According to an exemplary embodiment, the vehicle door 5 may be releasably held in the first closed position CP1 by the upper hold lock 31 and the lower hold lock 32 so that the vehicle door 5 may be kept in the first closed position CP1 by the upper hold lock 31 and the lower hold lock 32. That is, the upper hold lock 31 and the lower hold lock 32 may function as the closed hold lock which holds the vehicle door 5 in the first closed position CP1.

Referring to FIG. 4, the lower roller unit 22 may have a lower rotation axis CX2, and the vehicle door 5 may rotate around the lower rotation axis CX2. When the lower roller unit 22 is firmly held in the first closed position CP1 by the lower hold lock 32 and the first lower striker 32*a*, the vehicle door 5 may rotate around the lower rotation axis CX2.

As illustrated in FIG. 4, the upper rotation axis CX1 and the lower rotation axis CX2 may be vertically aligned, such as being collinear, and the vehicle door 5 may rotate around the vertically aligned upper and lower rotation axes CX1 and CX2.

Referring to FIG. 2, the selector 40 may be electrically connected to an actuator 43, and the actuator 43 may be configured to operate the upper hold lock 31 and the lower hold lock 32.

As the user selects the selector 40, the actuator 43 may selectively perform a hold operation in which the upper hold lock 31 holds the first upper striker 31*a* and the lower hold lock 32 holds the first lower striker 32*a*, and a release operation in which the upper hold lock 31 releases the first upper striker 31*a* and the lower hold lock 32 releases the first lower striker 32*a*.

When the user presses the first switch 41 of the selector 40 in a state in which the vehicle door 5 is closed, the upper hold lock 31 may release the first upper striker 31*a* and the lower hold lock 32 may release the first lower striker 32*a* simultaneously by the release operation of the actuator 43. Thus, the user may slide the vehicle door 5 in the longitudinal direction of the vehicle body 1 so that the vehicle door 5 may be opened and closed in the sliding mode.

When the user presses the second switch 42 of the selector 40 in a state in which the vehicle door 5 is closed, the upper hold lock 31 may hold the first upper striker 31*a* and the lower hold lock 32 may hold the first lower striker 32*a* simultaneously by the hold operation of the actuator 43, and the upper roller unit 21 and the lower roller unit 22 may be firmly held in the first closed position CP1. Thus, the user may swing the vehicle door 5 toward an interior space and an exterior space of the vehicle so that the vehicle door 5 may be opened and closed in the swing mode.

According to an exemplary embodiment, as illustrated in FIG. 2, one actuator 43 may operate the upper hold lock 31 and the lower hold lock 32 simultaneously.

According to another exemplary embodiment, an upper actuator operating the upper hold lock 31 and a lower actuator operating the lower hold lock 32 may be individually connected to the selector 40.

FIGS. 9A to 9D illustrate the upper hold lock 31 and the lower hold lock 32 according to an exemplary embodiment of the present disclosure. Referring to FIGS. 9A to 9D, each of the upper hold lock 31 and the lower hold lock 32 may include a catch 71, a pawl 72 releasably engaging with the catch 71, and a lever 73 operatively connected to the pawl 72. The lever 73 may be connected to the actuator 43 through a cable 75. As the cable 75 is reversed (pulled) by the actuator 43, the catch 71 may release the strikers 31*a* and 32*a*. A portion of the catch 71, the pawl 72, and the lever 73 may be covered by a cover plate 76, and the cover plate 76 may be attached to a mounting plate 74. The strikers 31*a* and 32*a* may be fixed to the vehicle body 1 by a mounting plate 78.

Referring to FIGS. 9A to 9D, the upper hold lock 31 may releasably hold the first upper striker 31*a*, and the lower hold lock 32 may releasably hold the first lower striker 32*a*.

Figure 9A:
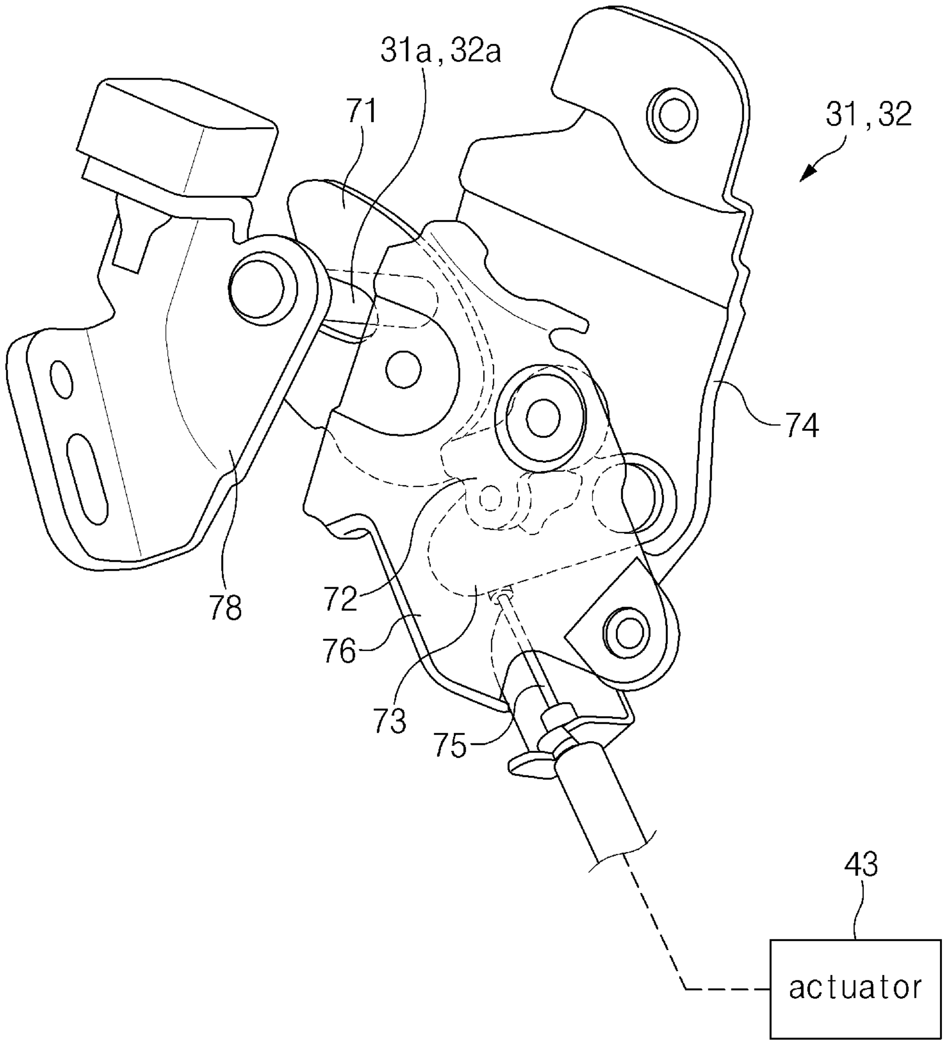
FIG. 9A illustrates a perspective view of an upper hold lock and a lower hold lock.
Figure 9B:
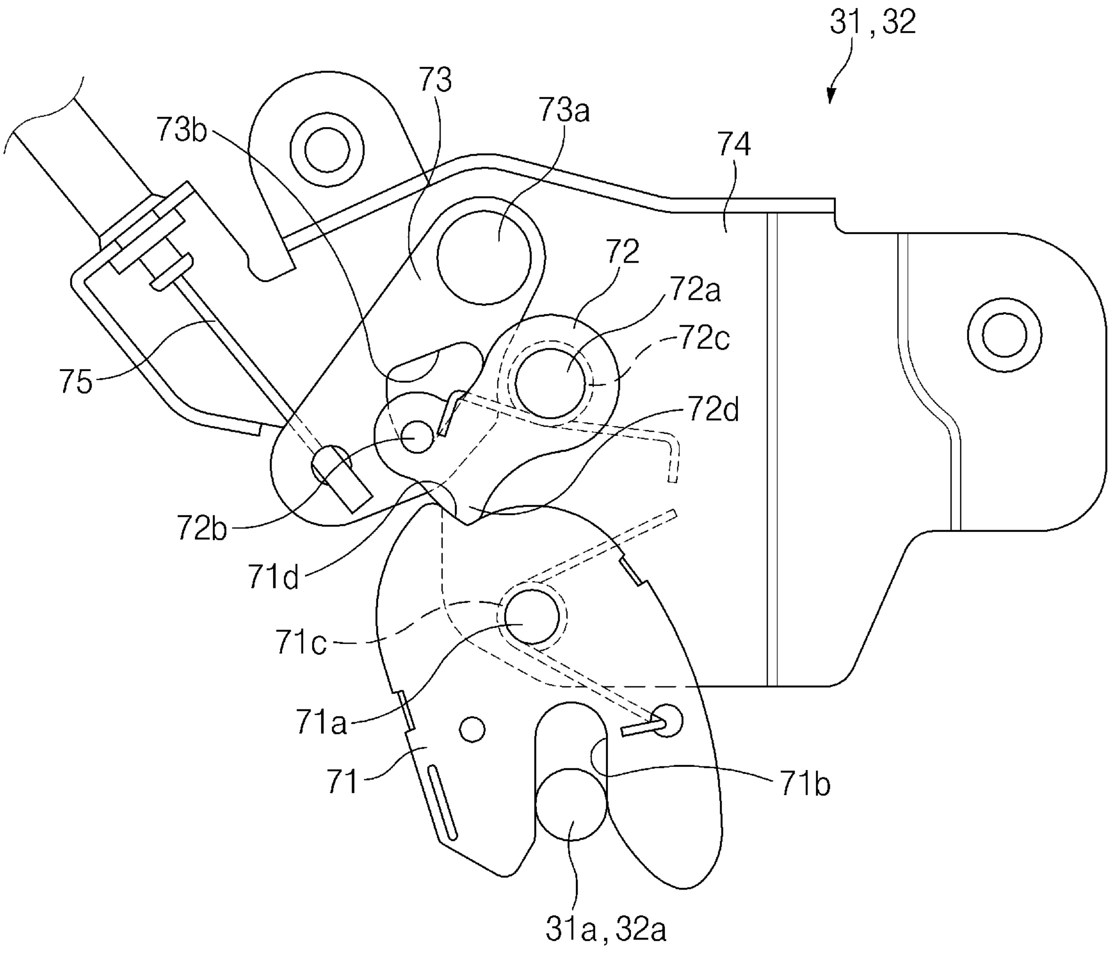
FIG. 9B illustrates a state in which an upper hold lock and a lower hold lock hold corresponding strikers.
Figure 9C:
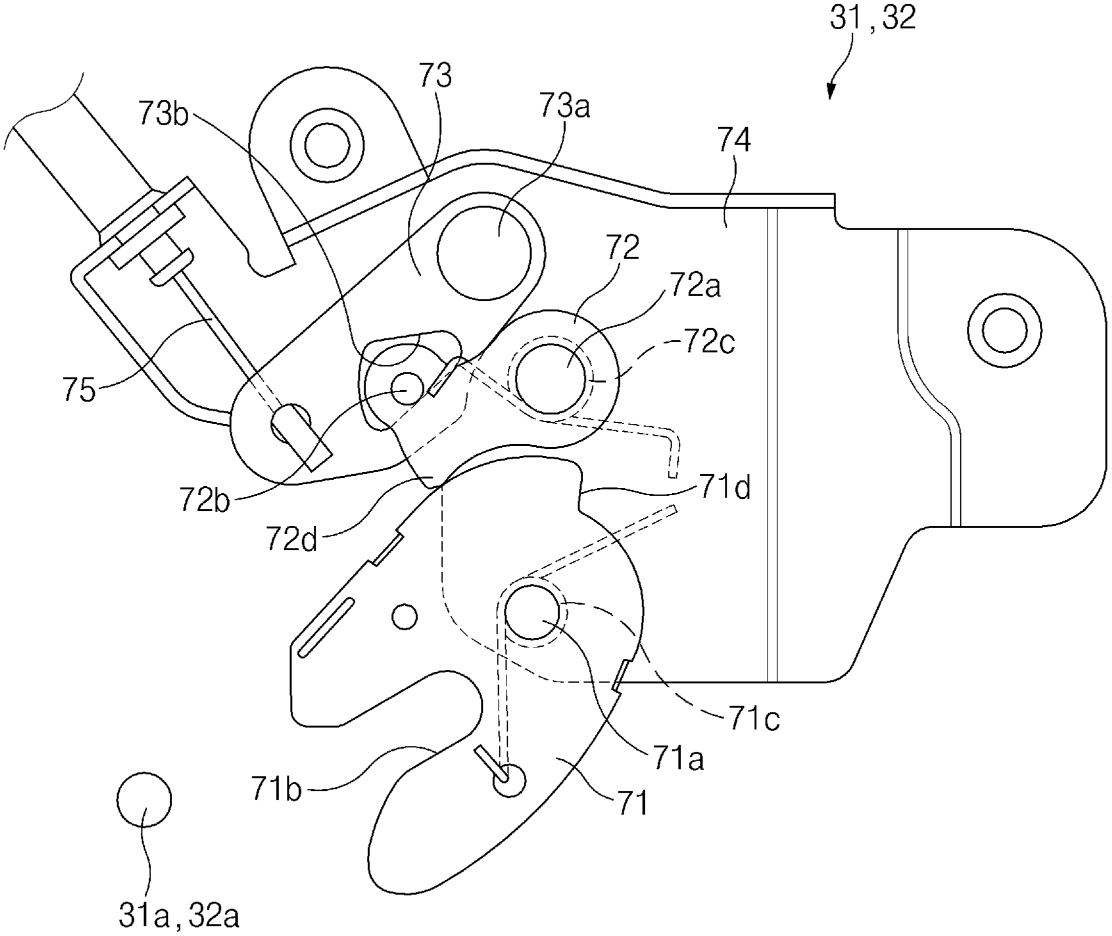
FIG. 9C illustrates a state in which an upper hold lock and a lower hold lock release corresponding strikers.

The catch 71 may be pivotally mounted on the mounting plate 74 through a first pivot shaft 71*a*. The catch 71 may have a slot 71*b* receiving the strikers 31*a* and 32*a*, and the catch 71 may engage with or release the strikers 31*a* and 32*a*. The catch 71 may move between an engaging position (see FIG. 9B) and a release position (see FIG. 9C). The engaging position refers to a position in which the catch 71 engages with the strikers 31*a* and 32*a* as illustrated in FIG. 9B, and the release position refers to a position in which the catch 71 releases the strikers 31*a* and 32*a* as illustrated in FIG. 9C. When the catch 71 is in the engaging position as illustrated in FIG. 9B, the catch 71 may engage with the strikers 31*a* and 32*a* so that the catch 71 may hold the strikers 31*a* and 32*a*. When the catch 71 is in the release position as illustrated in FIG. 9C, the catch 71 may release the strikers 31*a* and 32*a*. Thus, the strikers 31*a* and 32*a* may be released from the slot 71*b* of the catch 71 or be received in the slot 71*b* of the catch 71. The catch 71 may be biased toward the release position by a first biasing element 71*c* such as a torsion spring. The first biasing element 71*c* may be disposed around the first pivot shaft 71*a*. The catch 71 may have a locking shoulder 71*d*.

Figure 9D:
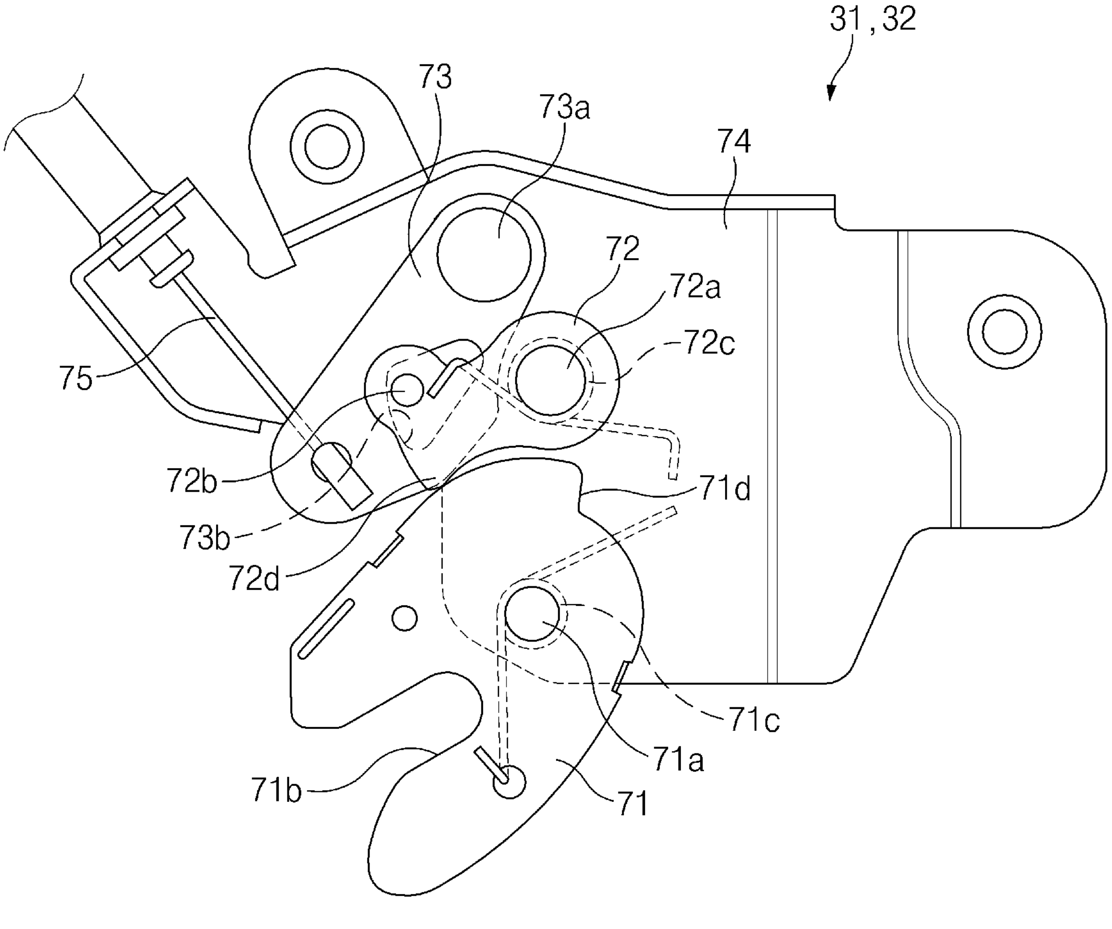
FIG. 9D illustrates a state in which an upper hold lock and a lower hold lock are allowed to receive corresponding strikers.

The pawl 72 may be pivotally mounted on the mounting plate 74 through a second pivot shaft 72*a*, and the pawl 72 may move between a pawl locking position (see FIG. 9B) and a pawl release position (see FIGS. 9C and 9D). The pawl locking position refers to a position in which the pawl 72 engages with the catch 71 and the catch 71 is kept in the engaging position, and the pawl release position refers to a position in which the pawl 72 releases the catch 71 and the catch 71 is allowed to move from the engaging position to the release position. As illustrated in FIG. 9B, when the pawl 72 is in the pawl locking position, the movement (rotation) of the catch 71 may be restricted by the pawl 72 so that the catch 71 may be kept in the engaging position. As illustrated in FIGS. 9C and 9D, when the pawl 72 is in the pawl release position, the movement (rotation) of the catch 71 may not be restricted by the pawl 72 so that the catch 71 may move from the engaging position to the release position. The pawl 72 may be biased toward the pawl locking position (see FIG. 9B) by a second biasing element 72*c* such as a torsion spring. The second biasing element 72*c* may be disposed around the second pivot shaft 72*a*.

The pawl 72 may have a locking projection 72*d* engageable with the locking shoulder 71*d* of the catch 71. As illustrated in FIG. 9B, as the pawl 72 is moved to the pawl locking position by the second biasing element 72*c*, the locking projection 72*d* of the pawl 72 may engage with the locking shoulder 71*d* of the catch 71 so that the movement (rotation) of the catch 71 may be restricted, and accordingly the catch 71 may be kept in the engaging position. As illustrated in FIG. 9C, as the pawl 72 is moved to the pawl release position by the lever 73, the locking projection 72*d* of the pawl 72 may be released from the locking shoulder 71*d* of the catch 71 so that the movement (rotation) of the catch 71 may be allowed, and accordingly the catch 71 may be moved to the release position by the first biasing element 71*c*.

The lever 73 may be pivotally mounted on the mounting plate 74 through a third pivot shaft 73*a*. The lever 73 may be connected to the actuator 43 through the cable 75. An end of the cable 75 may be fixed to the lever 73, and the cable 75 may be advanced or reversed by the actuator 43. As the actuator 43 moves the cable 75, the lever 73 may pivot around the third pivot shaft 73*a*. As the cable 75 is reversed, the lever 73 may move the pawl 72 to the pawl release position (see FIG. 9C).

The lever 73 may be operatively connected to the pawl 72 through a pin 72*b* and an opening 73*b*. The pin 72*b* may be provided on the pawl 72, and the opening 73*b* may be provided in the lever 73. The pin 72*b* may be movably received in the opening 73*b*. As the lever 73 pivots around the third pivot shaft 73*a*, the pin 72*b* may move in the opening 73*b*, allowing the pawl 72 to move.

As illustrated in FIG. 9B, when the cable 75 is advanced by the actuator 43, the locking projection 72*d* of the pawl 72 may engage with the locking shoulder 71*d* of the catch 71 so that the movement (rotation) of the catch 71 may be restricted. Accordingly, the catch 71 may be kept in the engaging position, and the strikers 31*a* and 32*a* may be held in the slot 71*b* of the catch 71. That is, the upper hold lock 31 and the lower hold lock 32 may hold the corresponding strikers 31*a* and 32*a*.

As illustrated in FIG. 9C, when the cable 75 is reversed by the actuator 43, the lever 73 may move the pawl 72 to the pawl release position. The locking projection 72*d* of the pawl 72 may be released from the locking shoulder 71*d* of the catch 71 so that the movement (rotation) of the catch 71 may be allowed. Accordingly, the catch 71 may be moved to the release position by the first biasing element 71*c*, and the strikers 31*a* and 32*a* may be released from the slot 71*b* of the catch 71. Thus, the upper hold lock 31 and the lower hold lock 32 may release the corresponding strikers 31*a* and 32*a*, and the upper roller unit 21 and the lower roller unit 22 may slide along the upper rail 11 and the lower rail 12.

As illustrated in FIG. 9D, even when the cable 75 is advanced by the actuator 43 in a state in which the locking projection 72*d* of the pawl 72 is released from the locking shoulder 71*d* of the catch 71, the catch 71 may be kept in the release position by the first biasing element 71C so that the movement (rotation) of the catch 71 may be allowable. In this state, the strikers 31*a* and 32*a* may be allowed to be received in the slot 71*b* of the catch 71. That is, in a state in which the movement (rotation) of the catch 71 is allowable as the locking projection 72*d* of the pawl 72 is released from the locking shoulder 71*d* of the catch 71, when the upper roller unit 21 and the lower roller unit 22 slide between the first closed position CP1 and the first open position OP1, the strikers 31*a* and 32*a* may be allowed to be received in the slot 71*b* of the catch 71. When an external force applied through the upper hold lock 31 and the lower hold lock 32 in a state in which the strikers 31*a* and 32*a* are received in the slot 71*b* of the catch 71 is greater than a spring force of the first biasing element 71*c*, the catch 71 may be moved to the engaging position. As illustrated in FIG. 9B, as the locking projection 72*d* of the pawl 72 engages with the locking shoulder 71*d* of the catch 71, the catch 71 may hold the strikers 31*a* and 32*a*.

Figure 5:
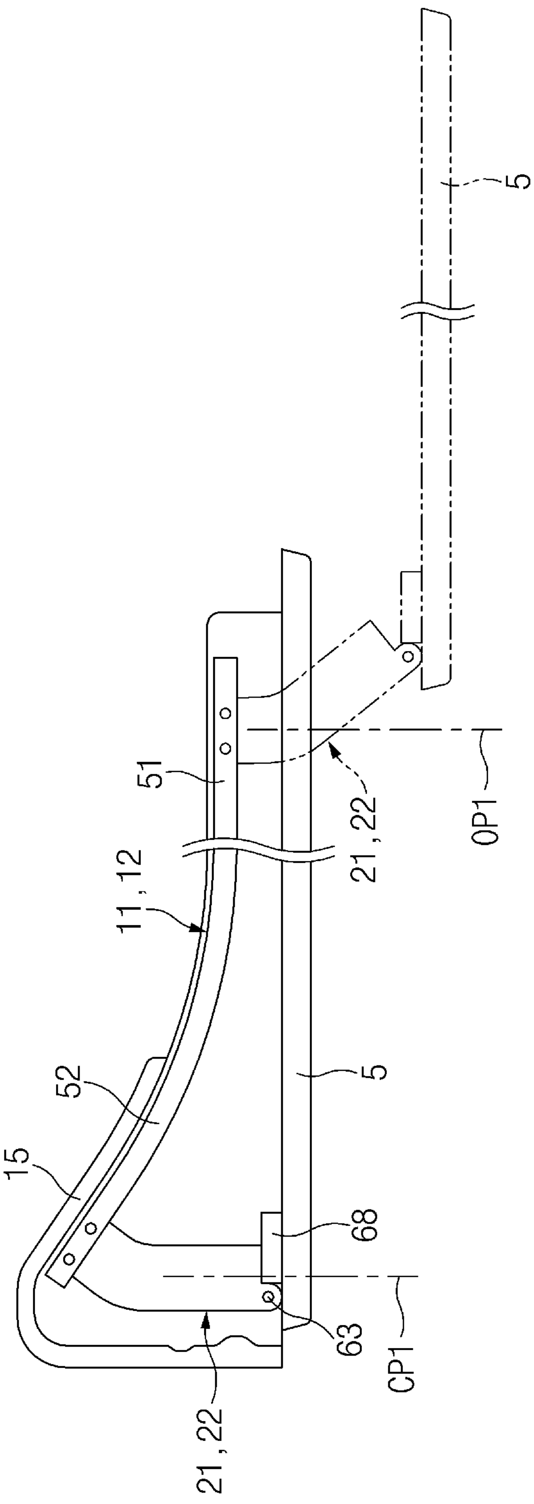
FIG. 5 illustrates a state in which an upper roller unit and a lower roller unit move along an upper rail and a lower rail when a vehicle door is opened and closed in a sliding mode in a vehicle door opening and closing apparatus according to an exemplary embodiment of the present disclosure.

Referring to FIG. 5, each of the upper rail 11 and the lower rail 12 may be mounted on the vehicle body 1 through a mounting bracket 15, and the mounting bracket 15 may have a shape corresponding to that of the upper rail 11 and the lower rail 12. Each of the upper rail 11 and the lower rail 12 may have a first extension portion 51 extending straightly in the longitudinal direction of the vehicle, and a second extension portion 52 extending from the first extension portion 51 toward the interior space of the vehicle. The second extension portion 52 may be bent with respect to the first extension portion 51 at a predetermined angle.

Figure 7:
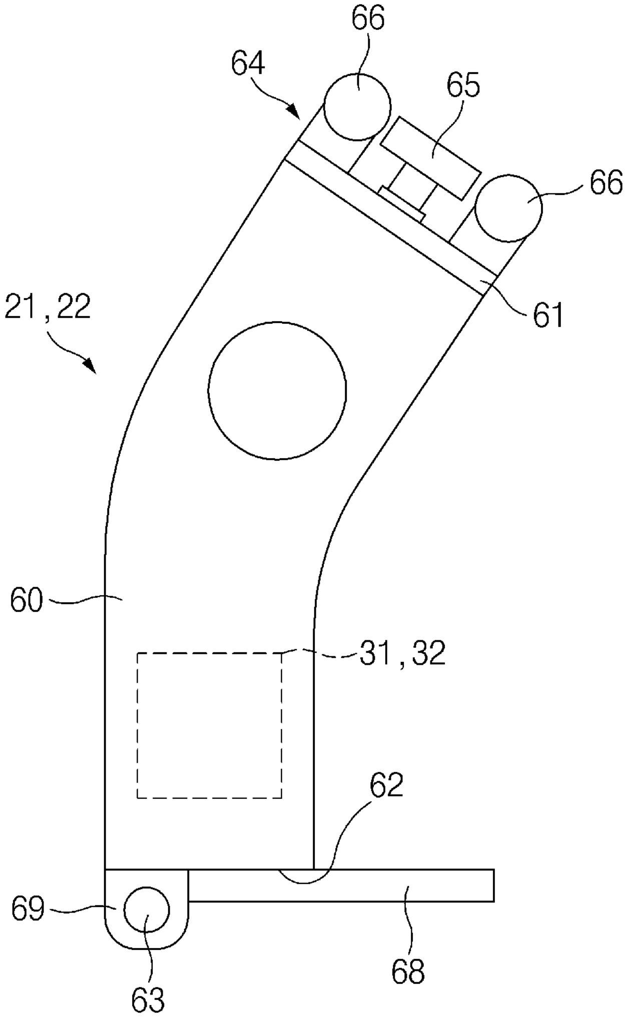
FIG. 7 illustrates an upper roller unit and a lower roller unit in a vehicle door opening and closing apparatus according to an exemplary embodiment of the present disclosure.
Figure 8:
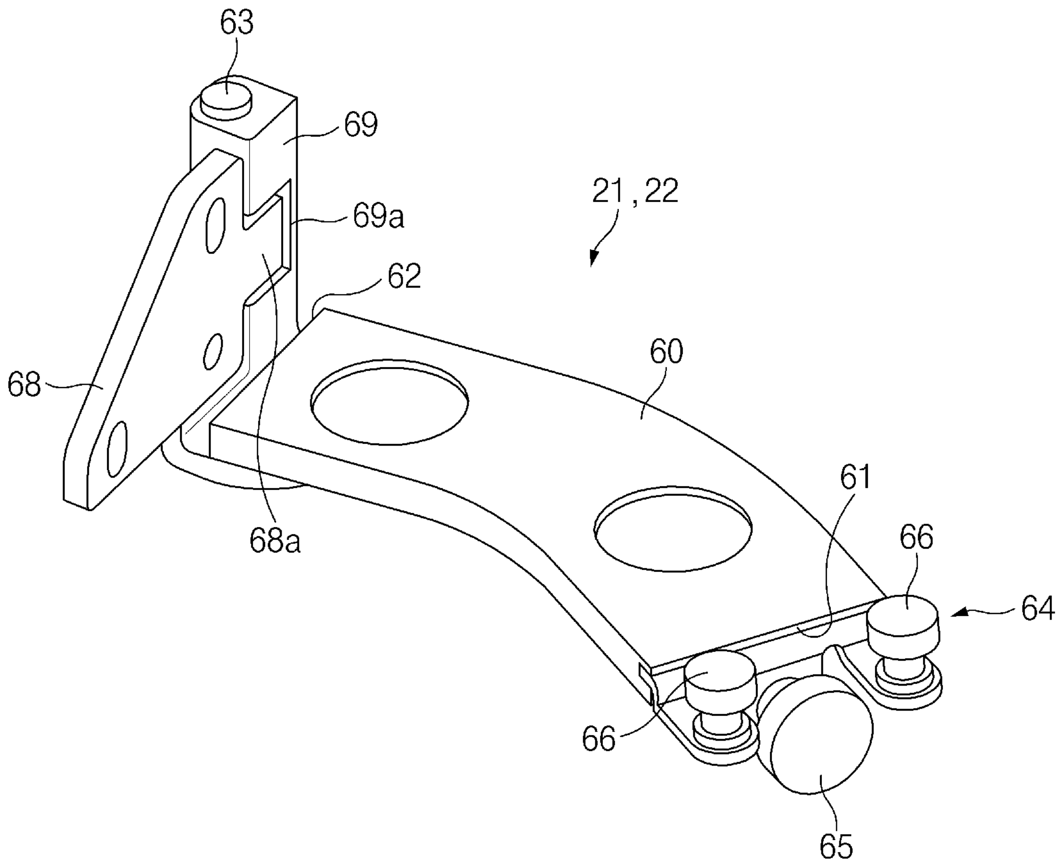
FIG. 8 illustrates a perspective view of an upper roller unit and a lower roller unit in a vehicle door opening and closing apparatus according to an exemplary embodiment of the present disclosure.

Referring to FIGS. 7 and 8, each of the upper roller unit 21 and the lower roller unit 22 may include a roller bracket 64 having rollers 65 and 66 rolling along the rails 11 and 12, and a body 60 connecting the roller bracket 64 and the vehicle door 5.

The roller bracket 64 may rotatably support the rollers 65 and 66, and the rollers 65 and 66 may roll along the upper rail 11 and the lower rail 12. As illustrated in FIG. 8, a middle roller 65 and two side rollers 66 disposed on both sides of the middle roller 65 may be rotatably mounted on the roller bracket 64. A rotation axis of the middle roller 65 may be perpendicular to a rotation axis of the side roller 66.

The body 60 may be curved so as not to interfere with the first extension portion 51 and the second extension portion 52. The body 60 may have a first end portion 61 facing the interior of the vehicle, and a second end portion 62 facing the exterior of the vehicle. The first end portion 61 of the body 60 may be fixed to the roller bracket 64 using fasteners, welding, and/or the like, and the second end portion 62 of the body 60 may be pivotally connected to the vehicle door 5 through a pivot pin 63. The vehicle door 5 may swing around the pivot pin 63 adjacent to the second end portion 62 of the body 60.

Referring to FIGS. 7 and 8, the roller bracket 64 may be directly fixed to the first end portion 61 of the body 60 using fasteners, welding, and/or the like, and the second end portion 62 of the body 60 may be pivotally connected to the vehicle door 5 through the pivot pin 63. A first pivot bracket 68 may be fixed to the vehicle door 5 using fasteners, welding, and/or the like, and a second pivot bracket 69 may be fixed to the second end portion 62 of the body 60 using fasteners, welding, and/or the like. The first pivot bracket 68 may have a lug 68*a*, and the second pivot bracket 69 may have a recess 69*a*. The lug 68*a* of the first pivot bracket 68 may be fitted into the recess 69*a* of the second pivot bracket 69, and the pivot pin 63 may extend through the lug 68*a* of the first pivot bracket 68 and the second pivot bracket 69. The upper rotation axis CX1 and the lower rotation axis CX2 may be defined by the pivot pin 63. For example, the upper rotation axis CX1 and the lower rotation axis CX2 may be a virtual axis extending vertically along a center point of the pivot pin 63, and the upper rotation axis CX1 and the lower rotation axis CX2 may be vertically aligned, and accordingly the vehicle door 5 may swing around the vertical rotation axis that virtually connects the upper rotation axis CX1 and the lower rotation axis CX2. The upper hold lock 31 may be fixed to the body 60 of the upper roller unit 21, and the lower hold lock 32 may be fixed to the body 60 of the lower roller unit 22.

When the upper hold lock 31 firmly holds the body 60 of the upper roller unit 21 in the first closed position CP1 and the lower hold lock 32 firmly holds the body 60 of the lower roller unit 22 in the first closed position CP1, the vehicle door 5 may swing around the upper rotation axis CX1 of the upper roller unit 21 and the lower rotation axis CX2 of the lower roller unit 22. Accordingly, the vehicle door 5 may move between the second closed position CP2 in which the vehicle door 5 is closed and the second open position OP2 in which the vehicle door 5 is opened.

Referring to FIG. 4, a main latch 80 may be mounted on a rear edge of the vehicle door 5, and a main striker 81 may be mounted on a peripheral face of the vehicle body 1 adjacent to a door frame area 8 of the vehicle body 1. The door frame area 8 refers to a frame area of the vehicle body 1 defining the door aperture 3. The main latch 80 may be located adjacent to the center roller unit 23, and the main striker 81 may be located adjacent to a front portion of the center rail 13.

Figure 10:
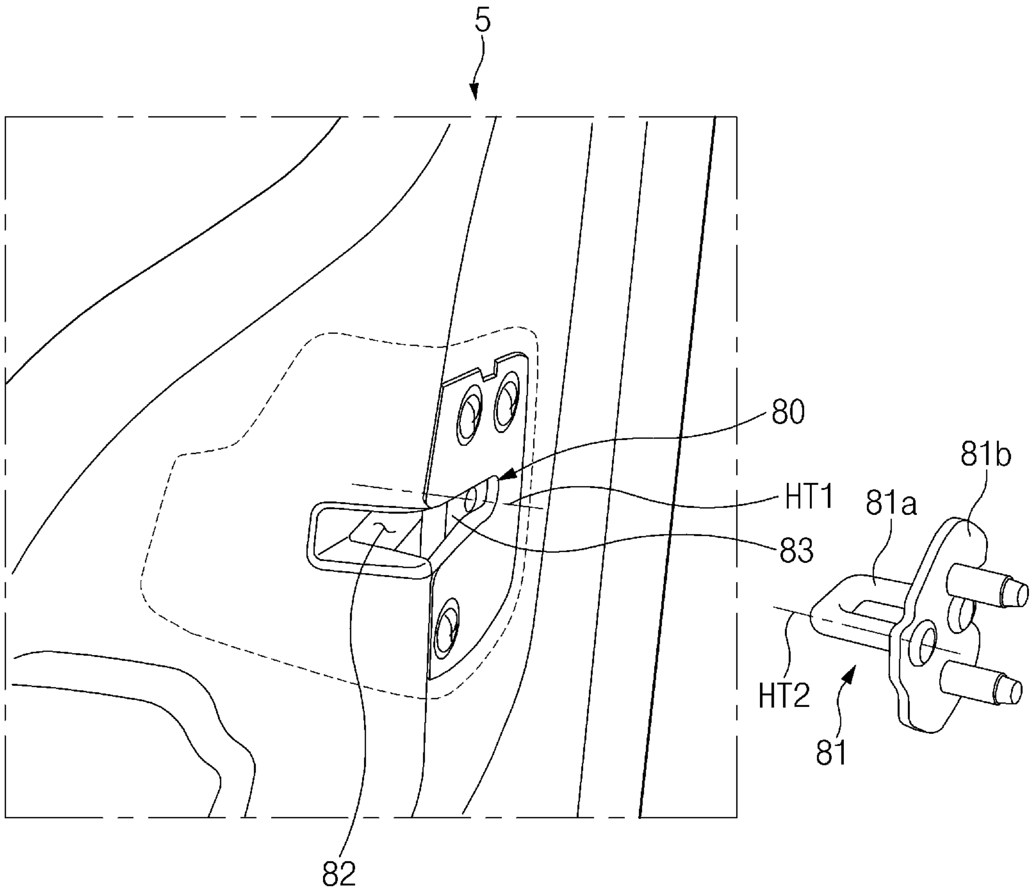
FIG. 10 illustrates a main latch mounted on a vehicle door and a main striker.

Referring to FIG. 10, the main latch 80 may be mounted on the rear edge of the vehicle door 5, and the main latch 80 may include a catch 83 rotatable around a rotation axis HT1 extending in the longitudinal direction of the vehicle. The main striker 81 may include a U-shaped rod 81*a*, and a base 81*b* fixed to the vehicle body 1. A slot 82 may be formed in the rear edge of the vehicle door 5, and the U-shaped rod 81*a* may be received in the slot 82 when the vehicle door 5 is closed. The U-shaped rod 81*a* may have a longitudinal axis HT2 extending in the longitudinal direction of the vehicle. The rotation axis HT1 of the catch 83 may be parallel to the longitudinal axis HT2 of the U-shaped rod 81*a*. In particular, the rotation axis HT1 of the catch 83 and the longitudinal axis HT2 of the U-shaped rod 81*a* may extend horizontally. The catch 83 of the main latch 80 may releasably engage with the rod 81*a* of the main striker 81. When the vehicle door 5 is in the first closed position CP1 or the second closed position CP2, the catch 83 of the main latch 80 may engage with the rod 81*a* of the main striker 81 by an engaging operation of the outside handle 6 so that the vehicle door 5 may be locked in the first closed position CP1 or the second closed position CP2. When the vehicle door 5 is in the first closed position CP1 or the second closed position CP2, the catch 83 of the main latch 80 may release the rod 81*a* of the main striker 81 by a release operation of the outside handle 6 so that the vehicle door 5 may be allowed to move in the sliding mode or the swing mode. When the vehicle door 5 is held in the first closed position CP1 and the catch 83 of the main latch 80 releases the rod 81*a* of the main striker 81, the center roller unit 23 may be released from the center rail 13, and thus the vehicle door 5 may be opened and closed in the swing mode.

Referring to FIGS. 1 and 3, the center rail 13 may extend along a center line of the vehicle body 1, and the center rail 13 may extend from a rear edge of the door aperture 3 in the longitudinal direction of the vehicle. The center roller unit 23 may be pivotally mounted on a central portion of the vehicle door 5. In particular, the center roller unit 23 may be mounted adjacent to a rear end of the vehicle door 5. The center roller unit 23 may be guided along the center rail 13.

Figure 11:
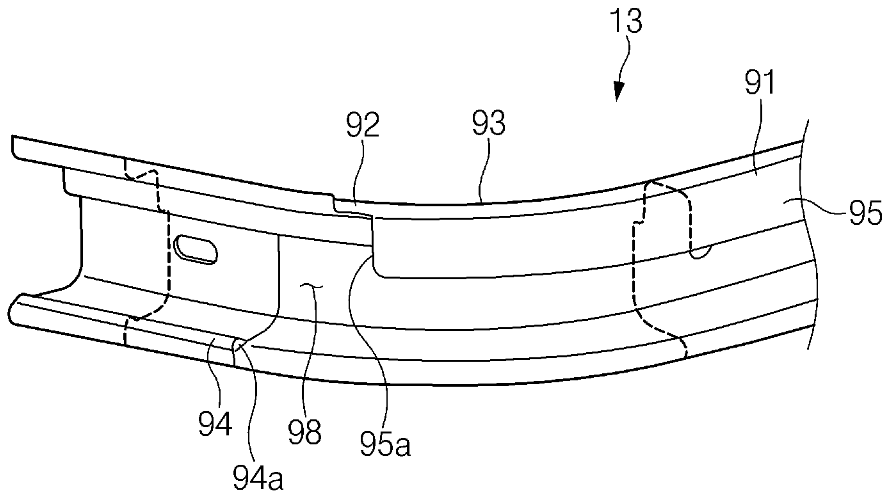
FIG. 11 illustrates a perspective view of a center rail in a vehicle door opening and closing apparatus according to an exemplary embodiment of the present disclosure.

Referring to FIG. 11, the center rail 13 may include a sliding guide 91 extending straightly in the longitudinal direction of the vehicle, and a swing guide 92 extending from the sliding guide 91 toward the interior of the vehicle. The swing guide 92 may be bent at a predetermined angle with respect to the sliding guide 91 through a bending portion 93, and the bending portion 93 may be curved at a predetermined radius.

Figure 12:
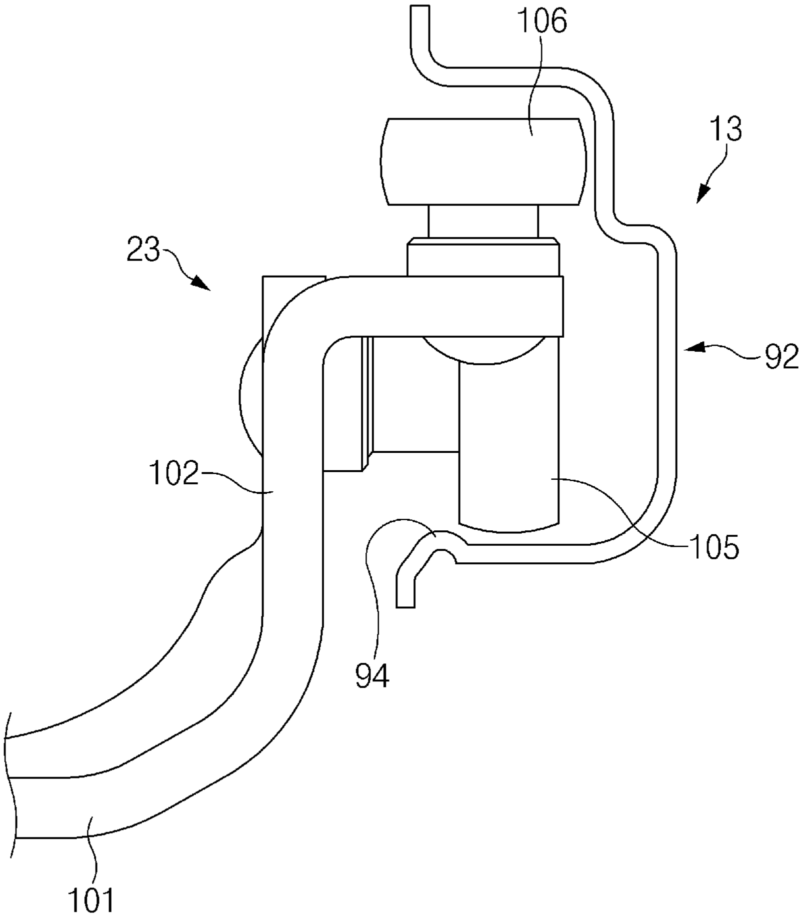
FIG. 12 illustrates a cross-sectional view of a swing guide of a center rail.
Figure 13:
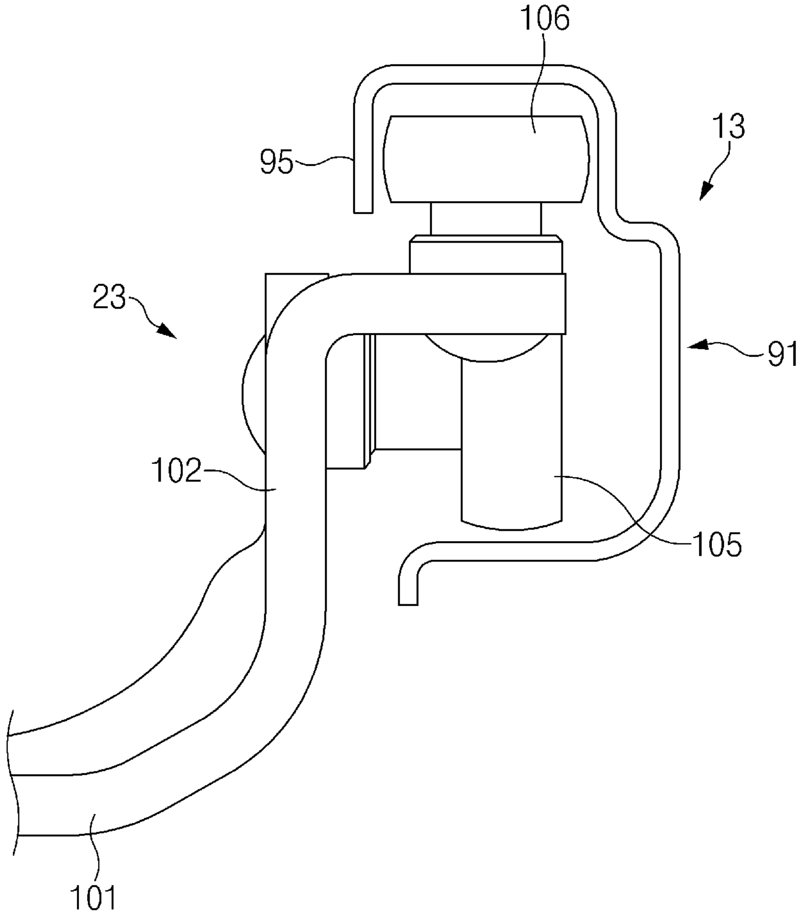
FIG. 13 illustrates a cross-sectional view of a sliding guide of a center rail.
Figure 14:
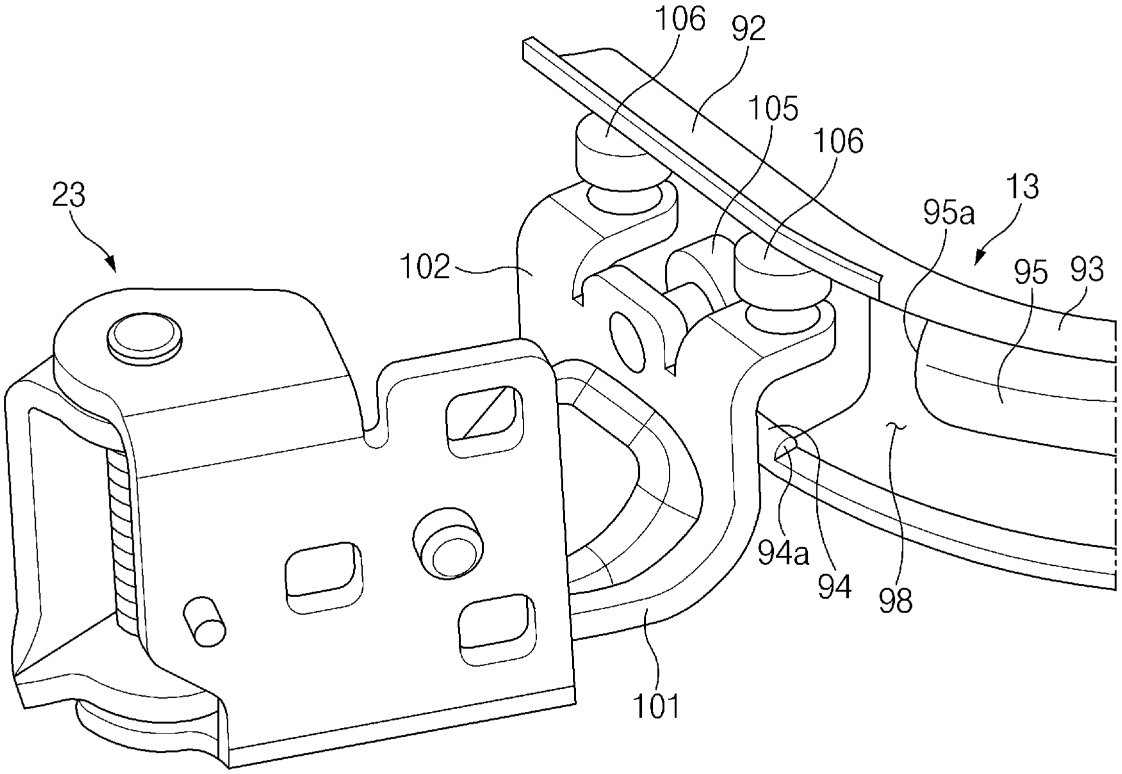
FIG. 14 illustrates a perspective view of a structure in which a center roller unit is held in a swing guide of a center rail.

Referring to FIGS. 12 to 14, the center roller unit 23 may include a roller bracket 101 and rollers 105 and 106 rotatably mounted on the roller bracket 101. The roller bracket 101 may include a first end portion adjacent to the center rail 13, and a second end portion relatively far from the center rail 13. The roller bracket 101 may be pivotally mounted on the central portion of the vehicle door 5, and the roller bracket 101 may include a roller arm 102 bent toward the center rail 13. The roller arm 102 may be bent from the first end portion of the roller bracket 101 at a predetermined angle. Specifically, the roller arm 102 may be perpendicular to the roller bracket 101. The plurality of rollers 105 and 106 may be rotatably mounted on the roller arm 102, and the plurality of rollers 105 and 106 may roll along the center rail 13. As illustrated in FIG. 14, a middle roller 105 and two side rollers 106 disposed on both sides of the middle roller 105 may be rotatably mounted on the roller arm 102 of the roller bracket 101. A rotation axis of the middle roller 105 may be perpendicular to a rotation axis of the side roller 106. The rollers 105 and 106 of the center roller unit 23 may be located on an upper portion of the center rail 13.

When the sliding mode is selected and the vehicle door 5 slides in the longitudinal direction of the vehicle, the sliding guide 91 may guide the rollers 105 and 106 of the center roller unit 23.

Referring to FIGS. 11 and 13, the sliding guide 91 may include a stopper wall 95 preventing the rollers 105 and 106 of the center roller unit 23 from being separated from the sliding guide 91. The sliding guide 91 may have an opening which is open to the exterior of the vehicle, and the stopper wall 95 may be located on an upper portion of the sliding guide 91. The stopper wall 95 may partially block an upper portion of the opening of the sliding guide 91 so that the sliding guide 91 may be partially opened to the exterior of the vehicle. In particular, the stopper wall 95 may be located to face the rollers 105 and 1o6 of the center roller unit 23 so that the stopper wall 95 may guide the movement of the rollers 105 and 106. The stopper wall 95 may extend along a length of the sliding guide 91 and a length of the bending portion 93. The stopper wall 95 may protrude vertically downward from an upper end of the sliding guide 91. As the stopper wall 95 closes the upper portion of the sliding guide 91 and an upper portion of the bending portion 93, the center roller unit 23 may be prevented from being separated from the sliding guide 91 as illustrated in FIG. 13.

When the swing mode is selected and the vehicle door 5 is opened and closed in the swing mode, the swing guide 92 may allow the rollers 105 and 106 of the center roller unit 23 to be released from the center rail 13.

The swing guide 92 may have an opening which is entirely open to the door aperture 3 and/or the exterior of the vehicle. A guide projection 94 may protrude upwardly from the bottom of the swing guide 92, and the guide projection 94 may extend along a length of the swing guide 92. When the vehicle door 5 swings from the second closed position CP2 to the second open position OP2 along a swing trajectory T1, the middle roller 105 of the center roller unit 23 may be guided along the guide projection 94 as illustrated in FIG. 12.

Figure 15:
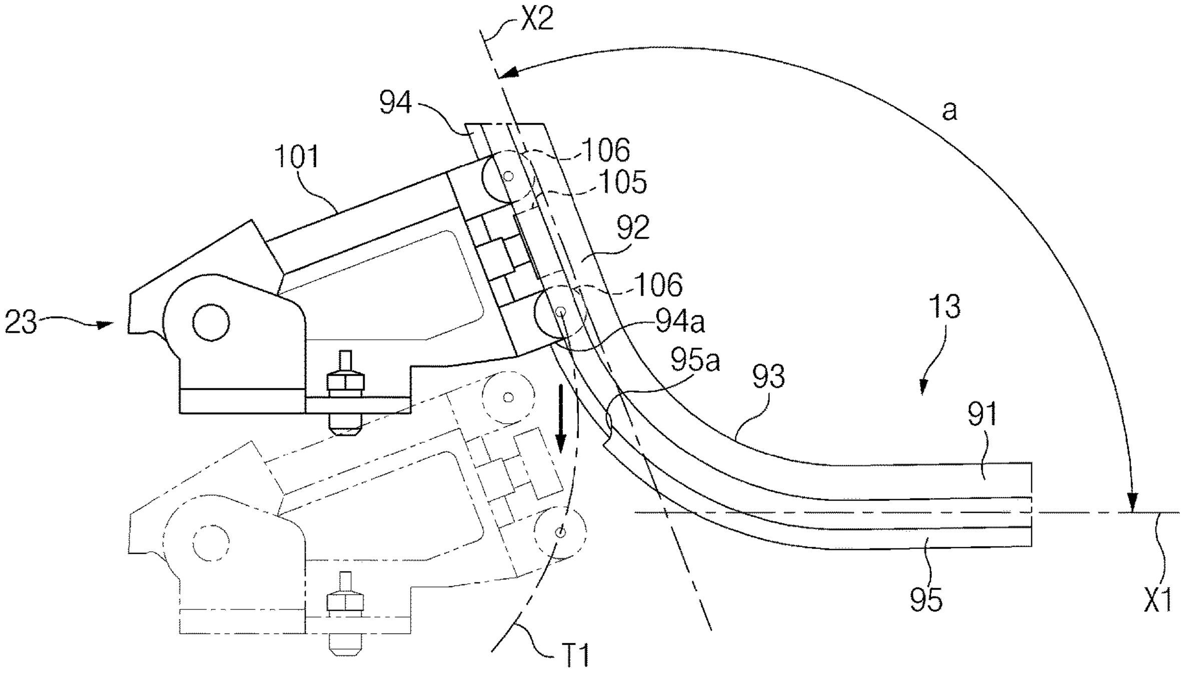
FIG. 15 illustrates a release operation in which a center roller unit is released from a swing guide of a center rail.

A front end 95*a* of the stopper wall 95 of the sliding guide 91 and a rear end 94*a* of the guide projection 94 may be located so as not to interfere with the swing trajectory T1 of the vehicle door 5. In addition, as illustrated in FIG. 15, an axis X1 of the sliding guide 91 and an axis X2 of the swing guide 92 may intersect at a predetermined angle a. In particular, the angle a of intersection between the axis X1 of the sliding guide 91 and the axis X2 of the swing guide 92 may be an obtuse angle, so that the rollers 105 and 106 of the center roller unit 23 may easily be released from the swing guide 92 of the center rail 13 or may easily be received in the swing guide 92 of the center rail 13.

The center rail 13 may include a space 98 allowing the rollers 105 and 106 of the center roller unit 23 to be released from the center rail 13 or be received in the center rail 13 when the vehicle door 5 swings in the swing mode. The space 98 may be defined between the front end 95*a* of the stopper wall 95 and the rear end 94*a* of the guide projection 94 as the front end 95*a* of the stopper wall 95 and the rear end 94*a* of the guide projection 94 are spaced apart from each other. Due to the space 98, there is no interference when the rollers 105 and 106 of the center roller unit 23 are released from the center rail 13 or are received in the center rail 13 in the swing mode.

As illustrated in FIG. 10, the catch 83 of the main latch 80 may rotate around the horizontally extending rotation axis HT1, and the longitudinal axis HT2 of the rod 81*a* of the main striker 81 may extend horizontally. In this state, the longitudinal axis HT2 of the rod 81*a* of the main striker 81 may be aligned perpendicular to any one of the swing trajectory T1 or a sliding trajectory T2. Accordingly, the angle and position of the catch 83 of the main latch 80 coming into contact with the rod 81*a* of the main striker 81 when the vehicle door 5 is closed in the swing mode may be different from those of the catch 83 of the main latch 80 coming into contact with the rod 81*a* of the main striker 81 when the vehicle door 5 is closed in the sliding mode.

Figure 16:
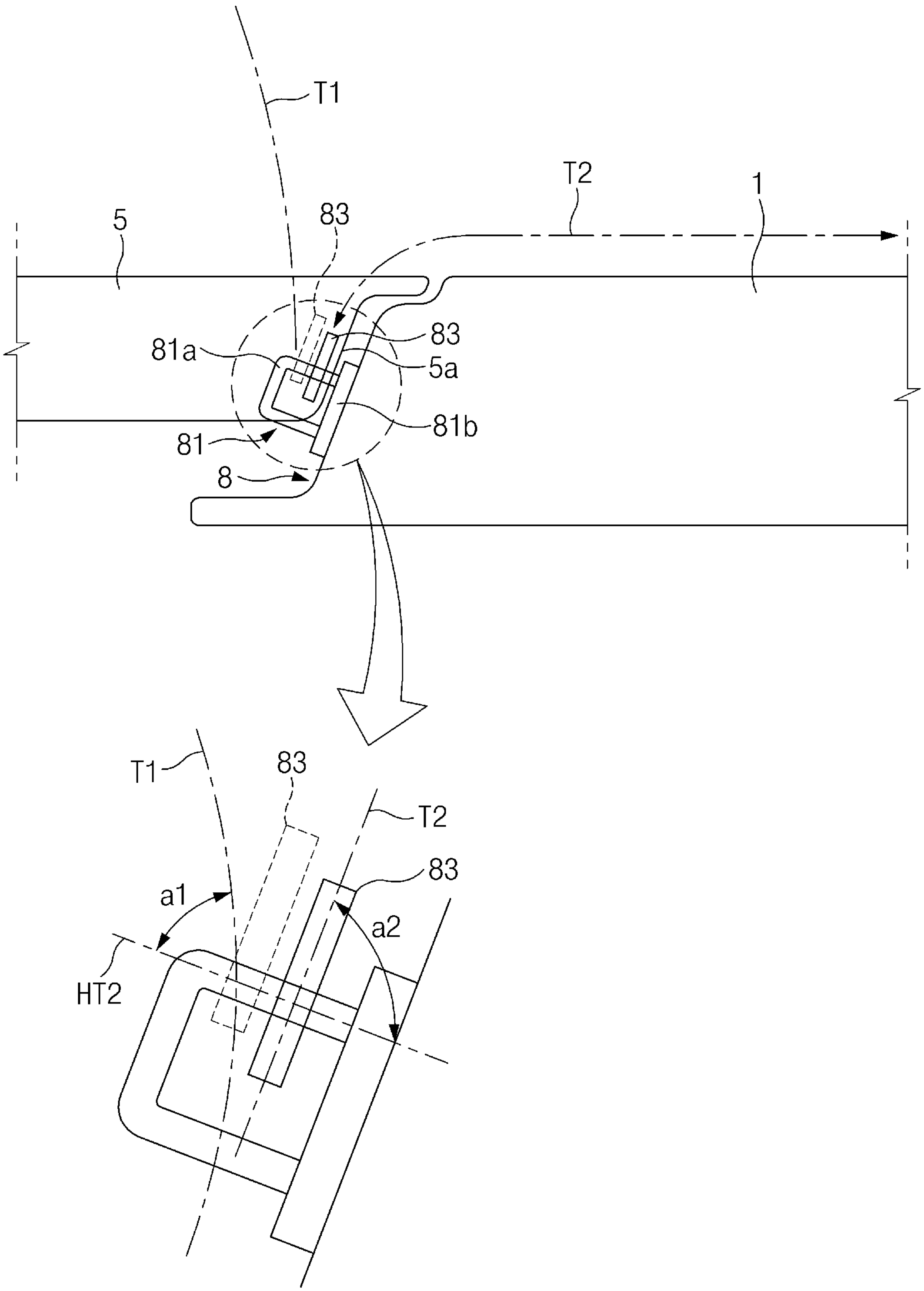
FIG. 16 illustrates a swing trajectory and a sliding trajectory of a vehicle door in a structure of a vehicle door opening and closing apparatus according to an exemplary embodiment of the present disclosure in which a catch of a main latch rotates around a horizontally extending rotation axis, and a longitudinal axis of a rod of a main striker extends horizontally.

Referring to FIG. 16, when the vehicle door 5 is opened and closed in the swing mode, the vehicle door 5 may move along the swing trajectory T1, and when the vehicle door 5 is opened and closed in the sliding mode, the vehicle door 5 may move along the sliding trajectory T2. The longitudinal axis HT2 of the rod 81*a* of the main striker 81 may be perpendicular to any one of the swing trajectory T1 or the sliding trajectory T2. Since the swing trajectory T1 and the sliding trajectory T2 are different from each other, the angle and position of the catch 83 of the main latch 80 coming into contact with the rod 81*a* of the main striker 81 when the vehicle door 5 is closed in the swing mode may be different from those of the catch 83 of the main latch 80 coming into contact with the rod 81*a* of the main striker 81 when the vehicle door 5 is closed in the sliding mode.

Referring to FIG. 16, when the vehicle door 5 is closed along the swing trajectory T1, a contact position between the catch 83 of the main latch 80 and the rod 81*a* of the main striker 81 may be indicated by a dotted line, and when the vehicle door 5 is closed along the sliding trajectory T2, a contact position between the catch 83 of the main latch 80 and the rod 81*a* of the main striker 81 may be indicated by a solid line. For example, when the longitudinal axis HT2 of the rod 81*a* of the main striker 81 is perpendicular to the sliding trajectory T2, an angle a2 of intersection between the catch 83 and the rod 81*a* may be a right angle, and accordingly good opening/closing quality of the vehicle door 5 in the sliding mode may be normally achieved. In this condition, when the vehicle door 5 is closed in the swing mode, an angle a1 of intersection between the swing trajectory T1 of the catch 83 and the longitudinal axis HT2 of the rod 81*a* may not be right-angled, and accordingly a load may be applied to the main latch 80 and/or the main striker 81. As a result, the vehicle door 5 may fail to provide good opening/closing quality in the swing mode. When the main striker 81 is aligned perpendicular to any one of the swing trajectory T1 or the sliding trajectory T2, the good opening/closing quality of the vehicle door 5 may be achieved in the aligned trajectory, but may not be achieved in the non-aligned trajectory, which may lead to fine vibrations or slight interference when the vehicle door 5 is opened and closed. When the vehicle door 5 is repeatedly opened and closed over time, fine loads may be accumulated, causing wear, cracks, deformation, and/or the like due to abnormal noise and/or impacts. As a result, durability may be reduced.

To deal with these problems, the vehicle door opening and closing apparatus, according to exemplary embodiments of the present disclosure, may be designed to allow a contact portion between a catch 111 of a main latch 110 and a rod 121 of a main striker 120 to slide when the vehicle door 5 is closed. Accordingly, even when the vehicle door 5 is closed in any one mode of the swing mode and the sliding mode, abnormal noise, impacts, vibrations, and the like may not be generated, and a reduction in durability may be prevented.

Figure 17:
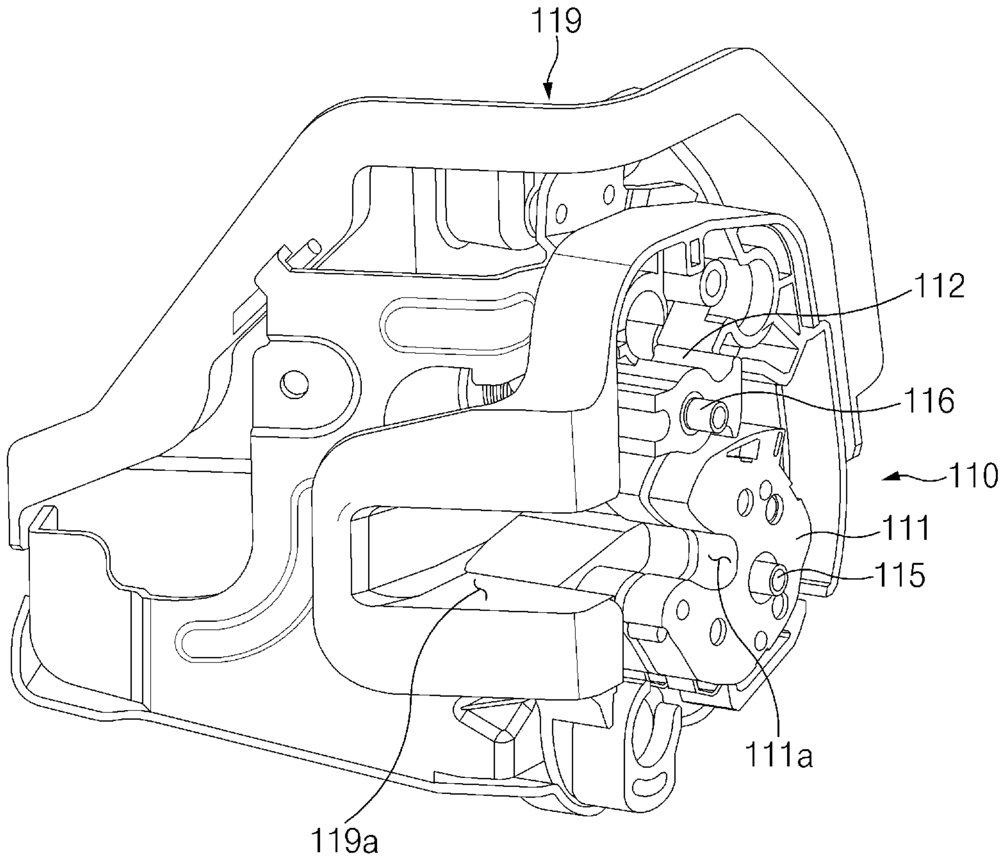
FIG. 17 illustrates a perspective view of a main latch in a vehicle door opening and closing apparatus according to an exemplary embodiment of the present disclosure.

The main latch 110 may be mounted on the rear edge of the vehicle door 5. Referring to FIG. 17, the main latch 110 may include a latch housing 119 mounted on the vehicle door 5. The latch housing 119 may have a slot 119*a* in which the rod 121 of the main striker 120 (see FIGS. 22 and 23) is received.

Referring to FIG. 17, the main latch 110 may include the catch 111 rotatably mounted in the latch housing 119, and a pawl 112 operatively connected to the catch 111. The catch 111 may rotate around a catch shaft 115. The pawl 112 may be mounted around a pawl shaft 116 to rotate around the pawl shaft 116. The catch shaft 115 and the pawl shaft 116 may be mounted in the latch housing 119.

Figure 18:
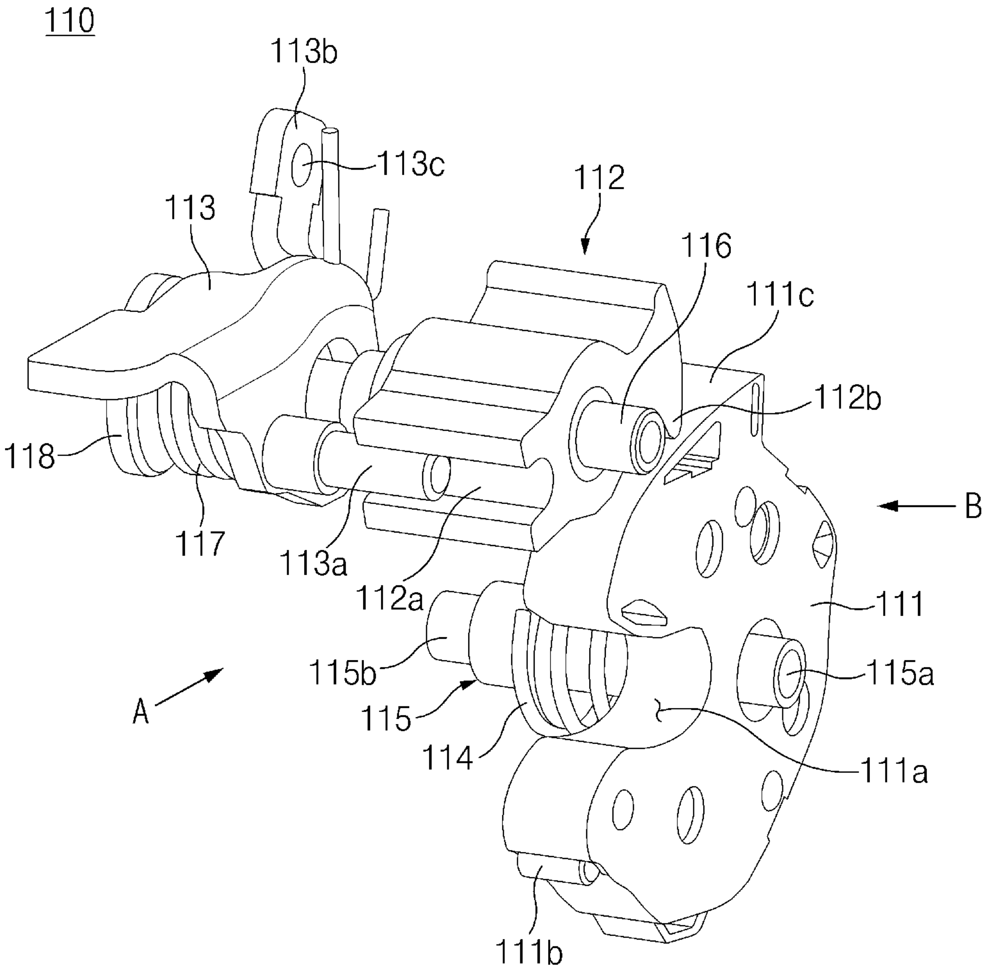
FIG. 18 illustrates a perspective view of a catch, a pawl, and a pawl stopper of a main latch in a vehicle door opening and closing apparatus according to an exemplary embodiment of the present disclosure.

Referring to FIG. 18, the catch 111 may include a slot 111*a* receiving the rod 121 of the main striker 120, and a locking shoulder 111*b* provided on an exterior surface of the catch 111. A longitudinal axis of the catch shaft 115 may extend in the longitudinal direction (that is, horizontal direction) of the vehicle, and the catch shaft 115 may have a first end portion 115*a* and a second end portion 115*b* opposing each other. The first end portion 115*a* may face the door frame area 8 of the vehicle body 1, and the second end portion 115*b* may face the interior of the vehicle door 5. When the vehicle door 5 is closed, the first end portion 115*a* of the catch shaft 115 may be close to the main striker 120.

Figure 19:
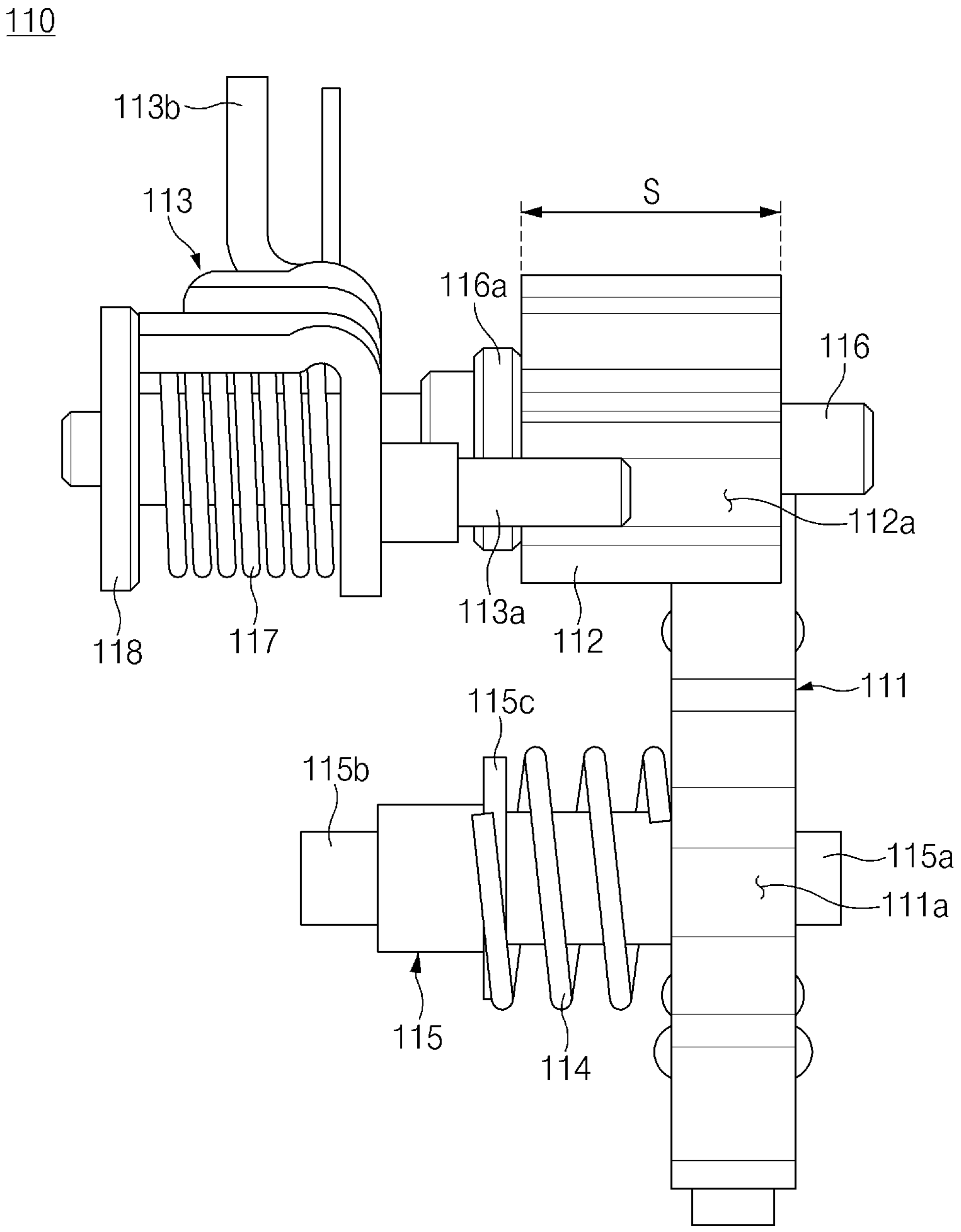
FIG. 19 illustrates a state in which a catch moves toward a first end portion of a catch shaft by a spring, which is viewed in a direction indicated by arrow A of FIG. 18.

Referring to FIG. 19, the catch shaft 115 may have a support wall 115*c* spaced apart from the catch 111 in a longitudinal direction of the catch shaft 115, and the support wall 115*c* may be closer to the second end portion 115*b* than the first end portion 115*a*. The catch 111 may be movable in the longitudinal direction of the catch shaft 115. When the vehicle door 5 is closed, the catch 111 of the main latch 110 may be configured to slide so that the generation of abnormal noise, vibrations, and the like between the main latch 110 and the main striker 120 and a reduction in durability may be prevented.

The catch 111 may be biased toward the first end portion 115*a* of the catch shaft 115 by a spring 114. According to an exemplary embodiment, the spring 114 may be disposed around the catch shaft 115, and the spring 114 may be disposed between the catch 111 and the support wall 115*c*. A first end portion of the spring 114 may contact the catch 111, and a second end portion of the spring 114 may contact the support wall 115*c* of the catch shaft 115. Accordingly, the spring 114 may provide a spring force allowing the catch 111 to be biased toward the first end portion of the catch shaft 115. As illustrated in FIG. 19, the catch 111 may move close to the first end portion of the catch shaft 115 by the spring force of the spring 114.

Figure 20:
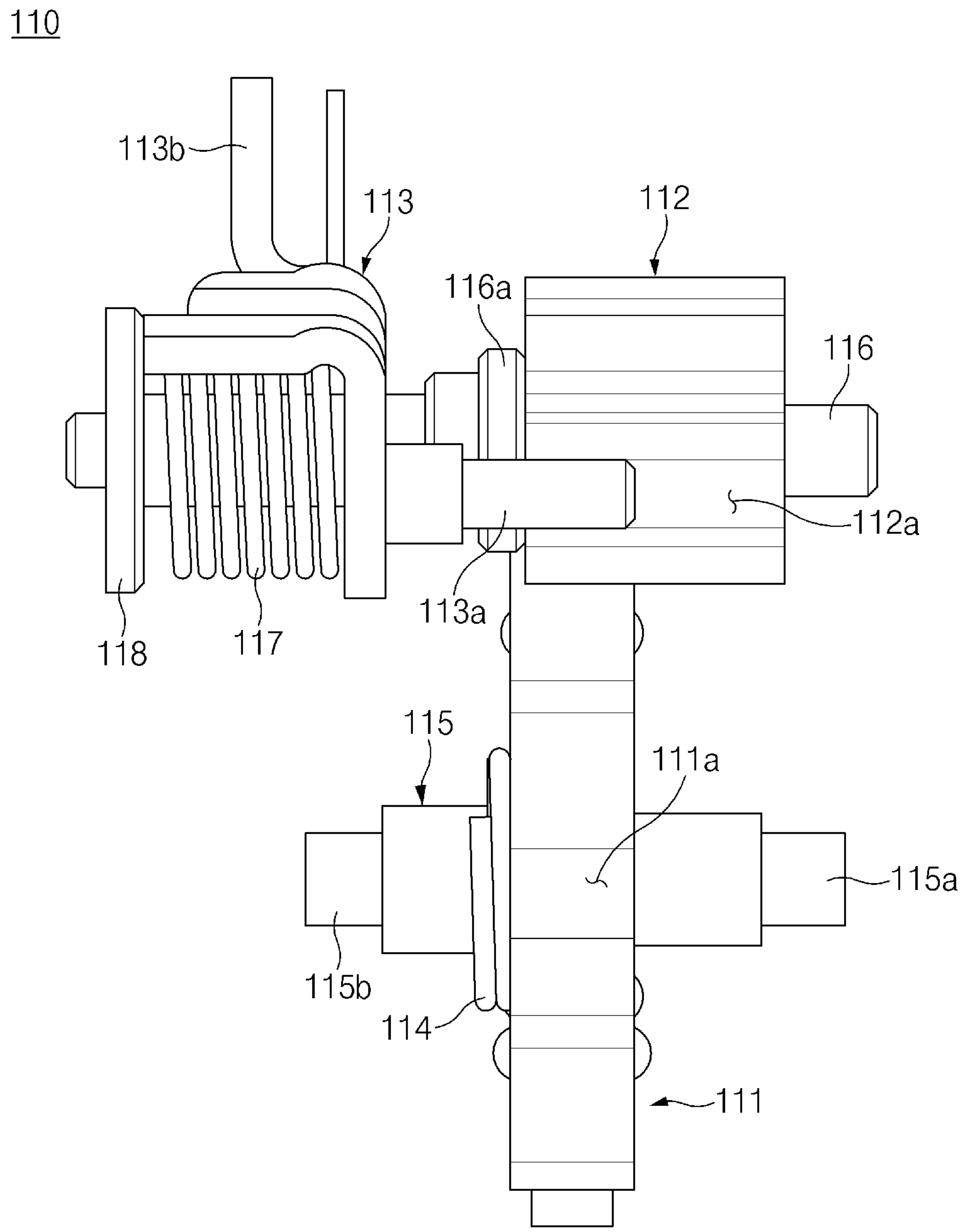
FIG. 20 illustrates a state in which a catch moves toward a second end portion of a catch shaft, which is viewed in a direction indicated by arrow A of FIG. 18.

Referring to FIG. 20, when the vehicle door 5 is closed, the catch 111 may come into contact with the rod 121 of the main striker 120, and accordingly the rod 121 may push the catch 111 toward the second end portion 115*b* of the catch shaft 115 (that is, an external force may act on the catch 111). When the external force overcomes the biasing force of the spring 114, the catch 111 may move toward the second end portion 115*b* of the catch shaft 115, and the spring 114 may be compressed. The catch 111 may move between a position adjacent the first end portion 115*a* of the catch shaft 115 and a position away from the first end portion 115*a* of the catch shaft 115.

Figure 21:
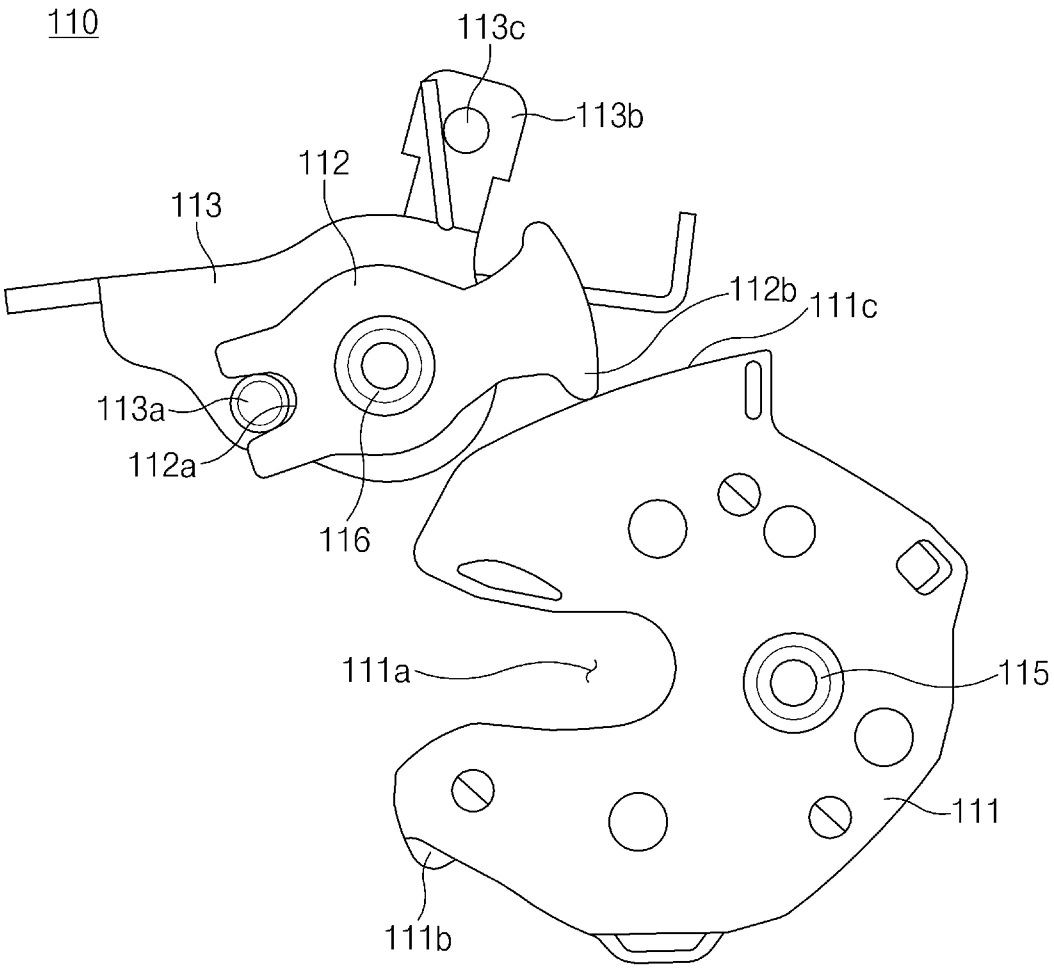
FIG. 21 illustrates a view, which is viewed in a direction indicated by arrow B of FIG. 18.

Referring to FIG. 21, the catch 111 may have a cam surface 111*c* coming into contact with a locking projection 112*b* of the pawl 112. The locking projection 112*b* of the pawl 112 may come into contact with the cam surface 111*c* of the catch 111 before the catch 111 comes into contact with the main striker 120.

Referring to FIG. 18, the pawl 112 may include a recess 112*a*, and the locking projection 112*b* releasably engaging with the locking shoulder 111*b* of the catch 111. The recess 112*a* may extend in a longitudinal direction of the pawl shaft 116. The pawl shaft 116 may have a support wall 116*a* supporting the pawl 112, and the support wall 116*a* may be provided on a middle portion of the pawl shaft 16.

Referring to FIG. 18, a pawl stopper 113 may be operatively connected to the pawl 112, and the pawl stopper 113 may have a pin 113*a* received in the recess 112*a* of the pawl 112. The pin 113*a* may extend in the longitudinal direction of the pawl shaft 16. As the pin 113*a* of the pawl stopper 113 is received in the recess 112*a* of the pawl 112, the pawl stopper 113 may be operatively connected to the pawl 112. The pawl stopper 113 may be disposed around the pawl shaft 116 to rotate around the pawl shaft 116. The pawl stopper 113 may have a connection projection 113*b*, a hole 113*c* may be provided in the connection projection 113*b*. An end portion of a cable (not shown) may be connected to the hole 113*c* of the connection projection 113*b*, and the pawl stopper 113 may be connected to the outside handle 6 through the cable. The pawl stopper 113 and the pawl 112 may face each other with the support wall 116*a* interposed therebetween.

Referring to FIGS. 19 and 20, a longitudinal axis of the pawl shaft 116 may extend in the longitudinal direction (that is, horizontal direction) of the vehicle. In addition, the pawl 112 may have a predetermined width S extending in the longitudinal direction (that is, horizontal direction) of the vehicle. The width S of the pawl 112 may correspond to a moving distance of the catch 111. The longitudinal axis of the pawl shaft 116 may be parallel to the longitudinal axis of the catch shaft 115. When the catch 111 moves along the longitudinal direction of the catch shaft 115, the catch 111 may be allowed to move within its moving distance corresponding to the width S of the pawl 112. Accordingly, while the catch 111 is moving, the catch 111 may continuously contact the pawl 112.

As the catch 111 rotates around the catch shaft 115, the catch 111 may move between an open position (see FIGS. 25 and 26) in which the slot 111*a* of the catch 111 is opened to the rod 121 and a locking position (see FIG. 27) in which the rod 121 of the main striker 120 is held in the slot 111*a*.

Figure 25:
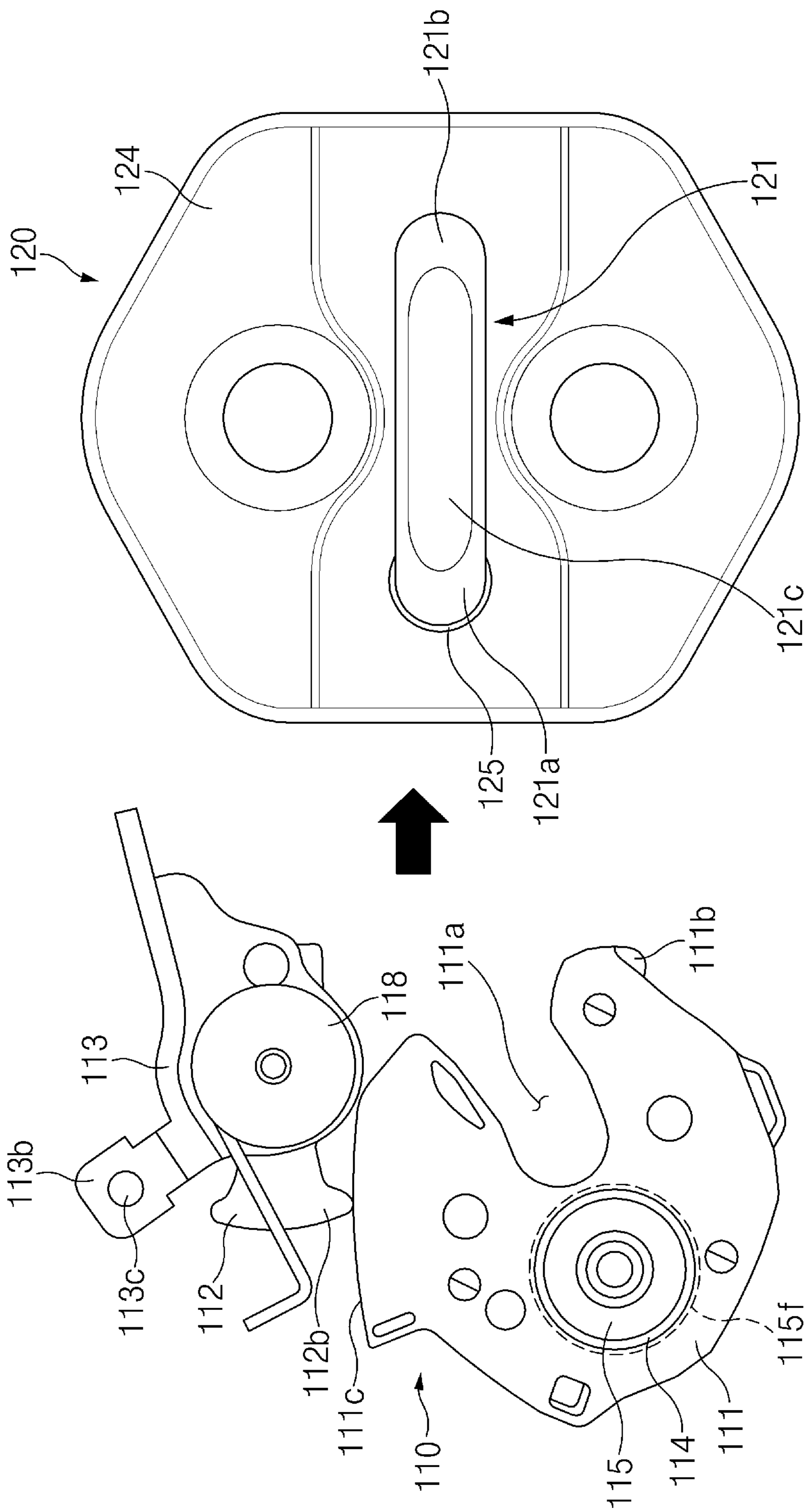
FIG. 25 illustrates a view, which is viewed in a direction indicated by arrow C of FIG. 24.
Figure 26:
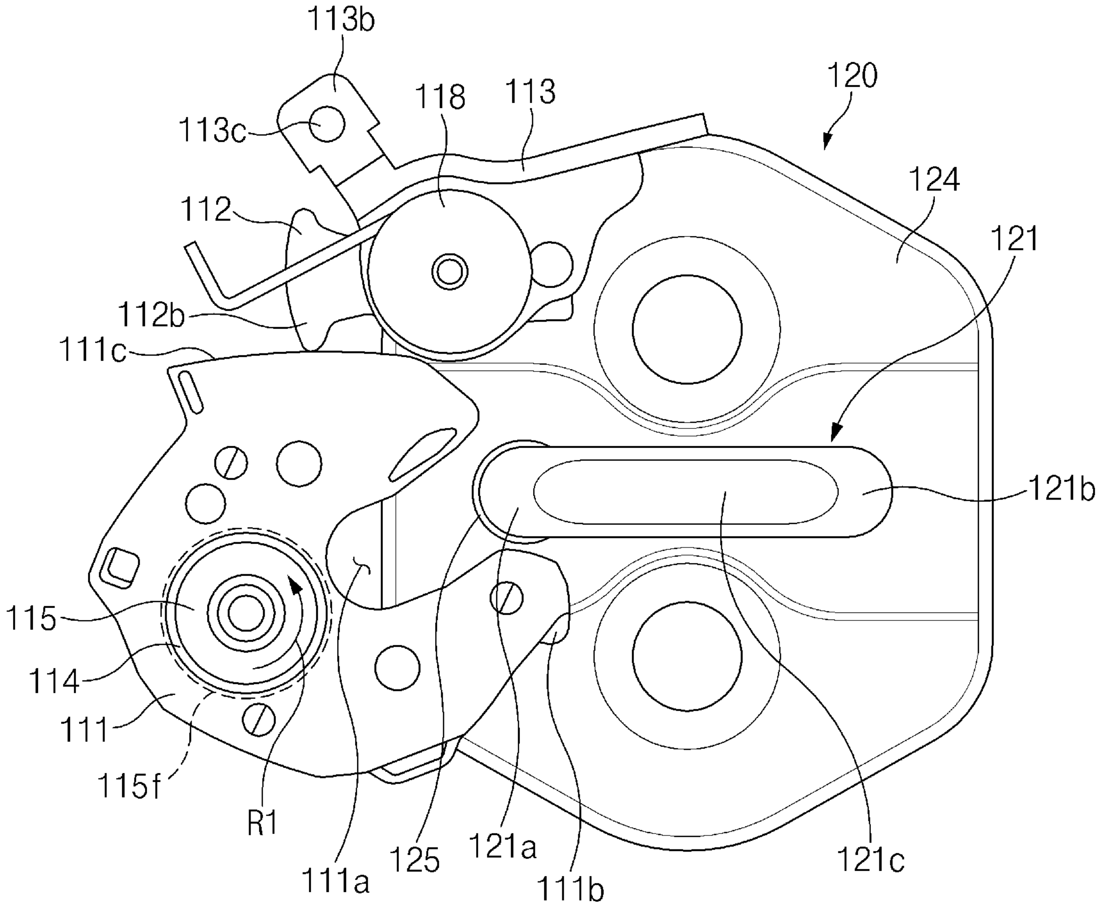
FIG. 26 illustrates a state in which a catch of a main latch starts to come into contact with a rod of a main striker in a vehicle door opening and closing apparatus according to an exemplary embodiment of the present disclosure.

Referring to FIGS. 25 and 26, when the catch 111 is in the open position, the slot 111*a* may be opened to the rod 121 of the main striker 120 so that the rod 121 may be received in or be disengaged from the slot 111*a* of the catch 111. The catch 111 may be biased toward the open position by a biasing element 115*f* such as a torsion spring.

Figure 27:
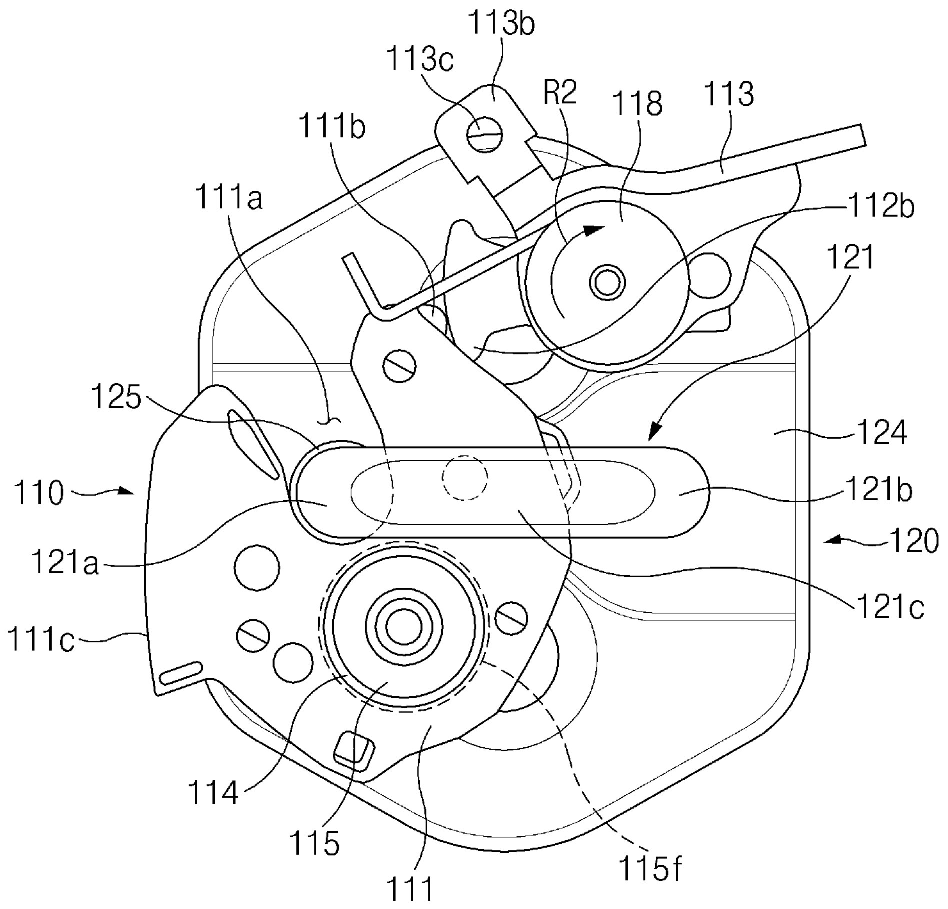
FIG. 27 illustrates a state in which a catch of a main latch locks a rod of a main striker in a vehicle door opening and closing apparatus according to an exemplary embodiment of the present disclosure.

Referring to FIG. 27, when the vehicle door 5 is closed, the slot 111*a* of the catch 111 may cooperate with the rod 121 of the main striker 120 so that the rod 121 of the main striker 120 may be received in the slot 111*a* of the catch 111. The rod 121 of the main striker 120 may force the catch 111 to move (rotate) toward the locking position, and accordingly the rod 121 may be held in the slot 111*a* of the catch 111, and the rod 121 may be prevented from being disengaged from the slot 111*a* of the catch 111.

As the pawl 112 rotates around the pawl shaft 116, the pawl 112 may move between an engageable position and a release position.

When the pawl 112 is in the engageable position, the locking projection 112*b* of the pawl 112 may engage with the locking shoulder 111*b* of the catch in (see FIG. 27) as the catch in rotates. When the pawl 112 is in the engageable position, the locking projection 112*b* of the pawl 112 may continuously contact the locking shoulder 111*b* of the catch in as illustrated in FIG. 27.

When the pawl 112 is in the release position, the locking projection 112*b* of the pawl 112 may push the locking shoulder 111*b* of the catch in so that the locking shoulder 111*b* of the catch in may be released from the locking projection 112*b* of the pawl 112.

The pawl stopper 113 may move between a first position in which the pawl stopper 113 holds the pawl 112 in the engageable position and a second position in which the pawl stopper 113 moves the pawl 112 to the release position. The pawl stopper 113 may be biased toward the first position by a biasing element 117 such as a torsion spring. As the cable (not shown) is pulled, the pawl stopper 113 may rotate in a clockwise direction (see direction R2 in FIG. 27). Accordingly, the pawl stopper 113 may move to the second position, thereby moving the pawl 112 to the release position in which the locking shoulder 111*b* of the catch 111 is released from the locking projection 112*b* of the pawl 112. The biasing element 117 may be disposed around the pawl shaft 116. A support 118 may be fixed to the pawl shaft 116, and the support 118 may support the biasing element 117.

Figure 22:
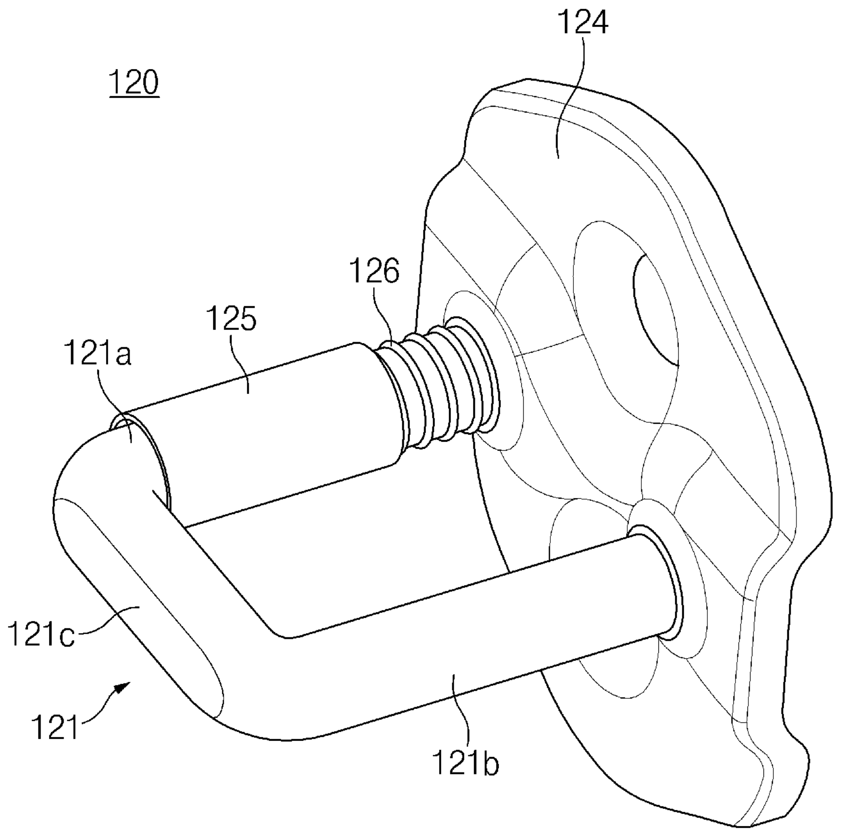
FIG. 22 illustrates a perspective view of a main striker in a vehicle door opening and closing apparatus according to an exemplary embodiment of the present disclosure, in a state in which a sleeve moves away from a mounting plate.
Figure 23:
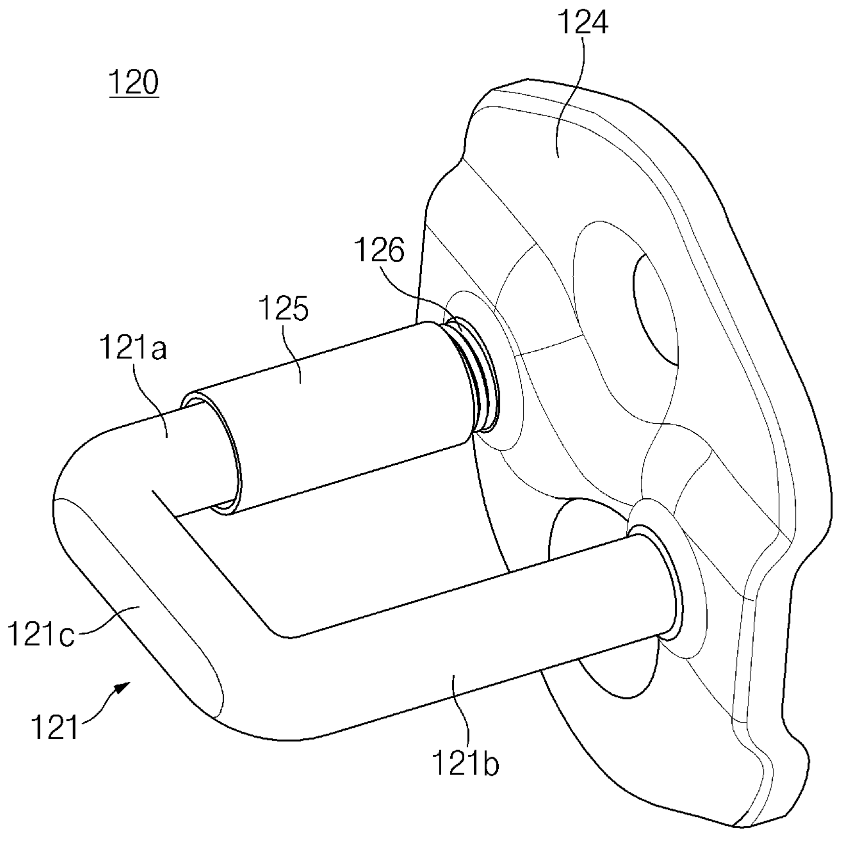
FIG. 23 illustrates a perspective view of a main striker in a vehicle door opening and closing apparatus according to an exemplary embodiment of the present disclosure, in a state in which a sleeve moves toward a mounting plate.

The main striker 120 may be mounted on the peripheral face of the vehicle body 1 adjacent to the door frame area 8 of the vehicle body 1. Referring to FIGS. 22 and 23, the main striker 120 may include a mounting plate 124 mounted on the peripheral face of the vehicle body 1 adjacent to the door frame area 8, and the rod 121 extending from the mounting plate 124. The rod 121 may include two leg portions 121*a* and 121*b*, and a bridge portion 121C connecting the two leg portions 121*a* and 121*b*. The mounting plate 124 may be mounted on the peripheral face of the vehicle body 1 adjacent to the door frame area 8 using fasteners, welding, and/or the like. The main striker 120 may include a sleeve 125 movably mounted on any one (the leg portion 121*a*) of the two leg portions 121*a* and 121*b*. The sleeve 125 may be movable along a longitudinal axis of the leg portion 121*a* of the rod 121. Referring to FIG. 22, the sleeve 125 moving on the leg portion 121*a* may be biased toward the bridge portion 121*c* by a spring 126, and accordingly the sleeve 125 may move away from the mounting plate 124. Referring to FIG. 23, as an external force acts on the sleeve 125, the sleeve 125 may move toward the mounting plate 124, and the spring 126 may be compressed.

The sleeve 125 may move between a position adjacent the bridge portion 121*c* (position away from the mounting plate 124) and a position adjacent the mounting plate 124.

In addition, the sleeve 125 may be rotatable on an exterior surface of the leg portion 121*a*. When the slot 111*a* of the catch 111 comes into contact with the sleeve 125, the sleeve 125 may rotate to thereby facilitate the rotation of the catch 111 more smoothly.

Figure 24:
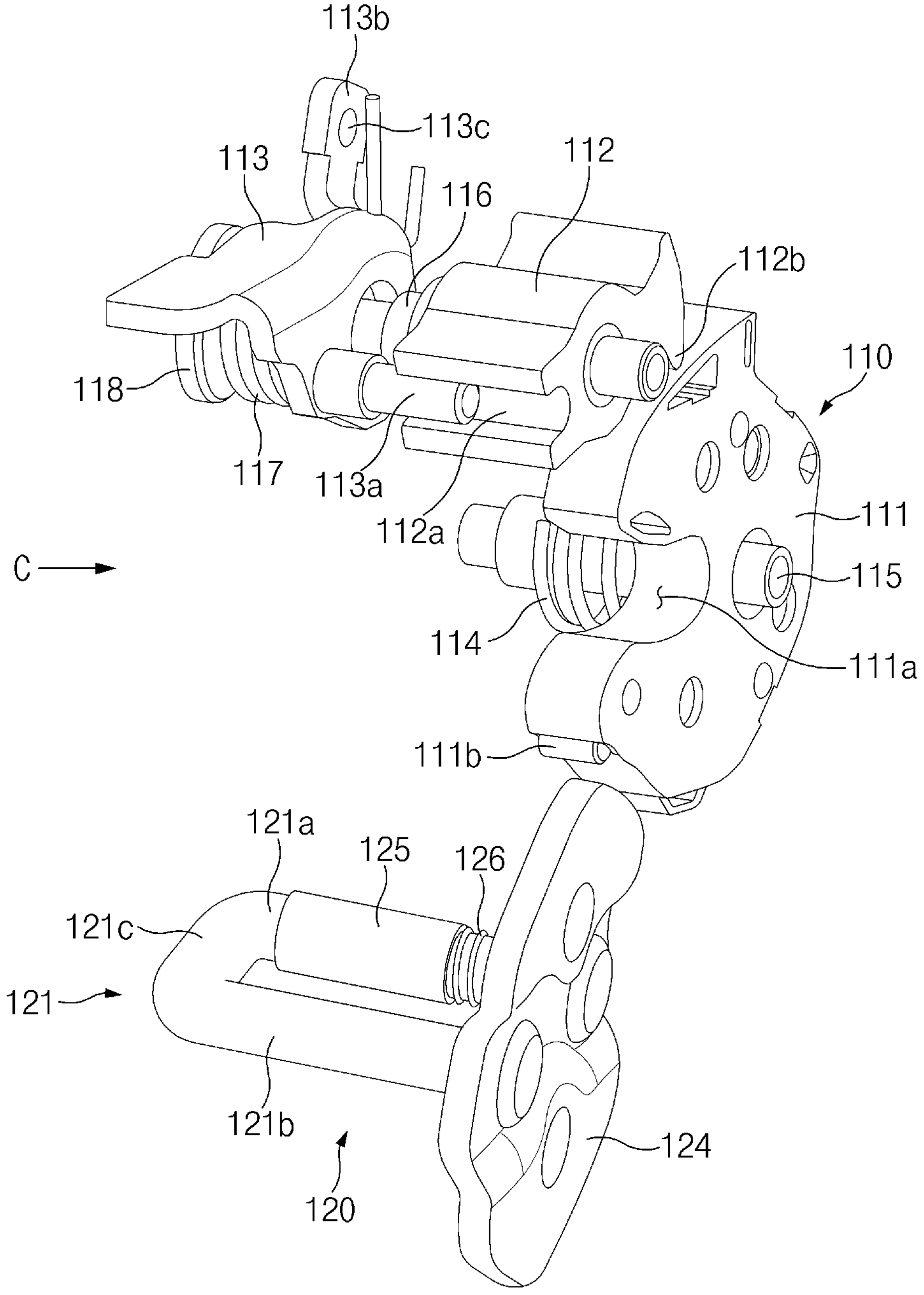
FIG. 24 illustrates a state in which a main latch is spaced apart from a main striker in a vehicle door opening and closing apparatus according to an exemplary embodiment of the present disclosure.

Referring to FIG. 24, before the vehicle door 5 is closed in the swing mode, the contact between the catch 111 and the pawl 112 may be maintained. The catch 111 may be held close to the first end portion of the catch shaft 115 by the spring force of the spring 114, and the sleeve 125 may be kept away from the mounting plate 124 by the spring force of the spring 126.

As the vehicle door 5 is closed in the swing mode in a state in which the main latch 110 is kept away from the main striker 120 (see FIG. 25), the slot 111*a* of the catch 111 may come into contact with the sleeve 125 as illustrated in FIG. 26. As the sleeve 125 of the main striker 120 is received in the slot 111*a* of the catch 111, the sleeve 125 may rotate the catch 111 in a counterclockwise direction (see direction R1 in FIG. 26), and accordingly the catch 111 may lock the sleeve 125.

Figure 28:
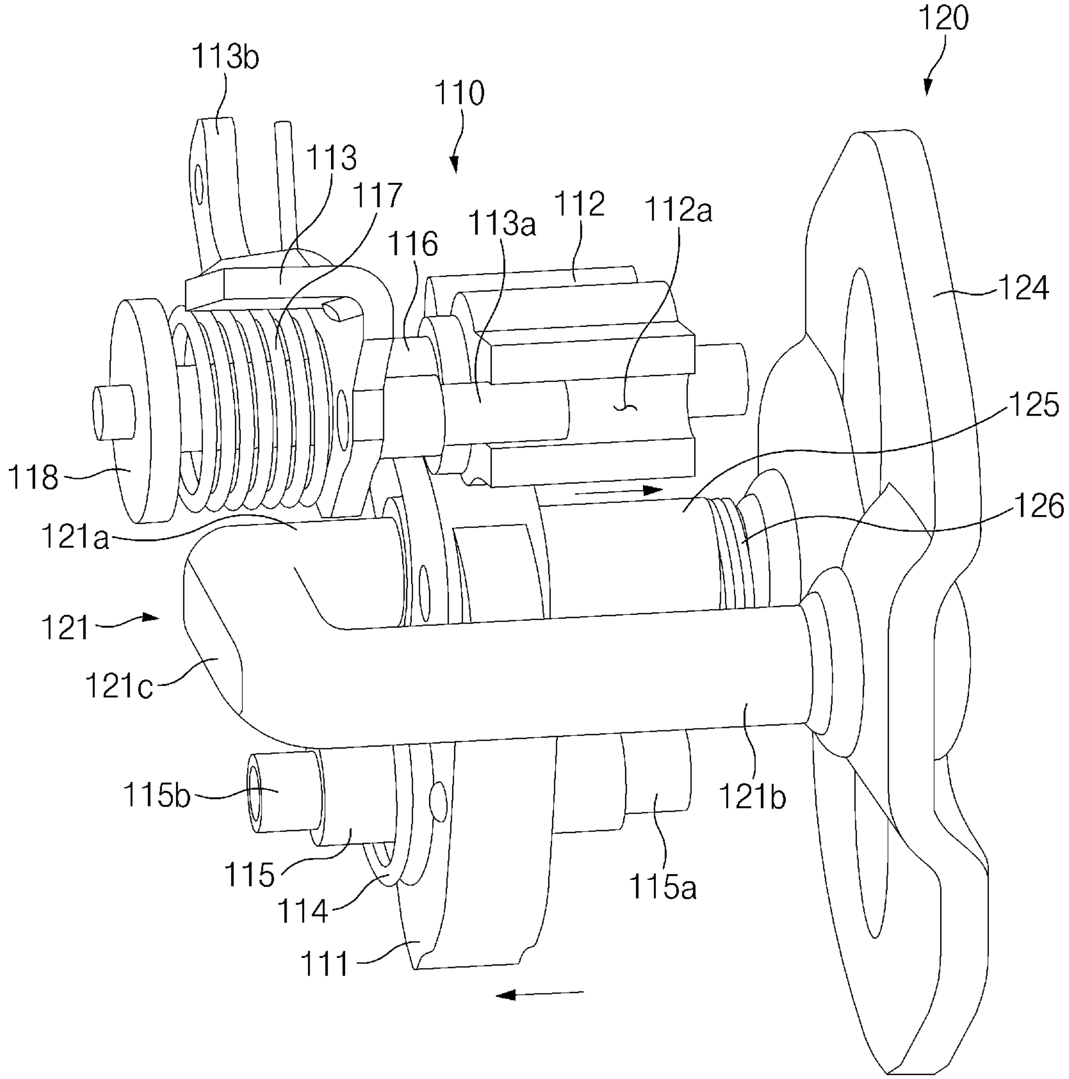
FIG. 28 illustrates a state in which a catch of a main latch moves toward a second end portion of a catch shaft, and a sleeve of a main striker moves toward a mounting plate in a vehicle door opening and closing apparatus according to an exemplary embodiment of the present disclosure.

Referring to FIG. 28, as the catch 111 comes into contact with the sleeve 125, the catch 111 may move away from the first end portion 115*a* of the catch shaft 115 by the sleeve 125, and the spring 114 may be compressed. The sleeve 125 may move toward the mounting plate 124 by the catch 111, and the spring 126 may be compressed. That is, the catch in and the sleeve 125 may move in the opposite directions.

Figure 29:
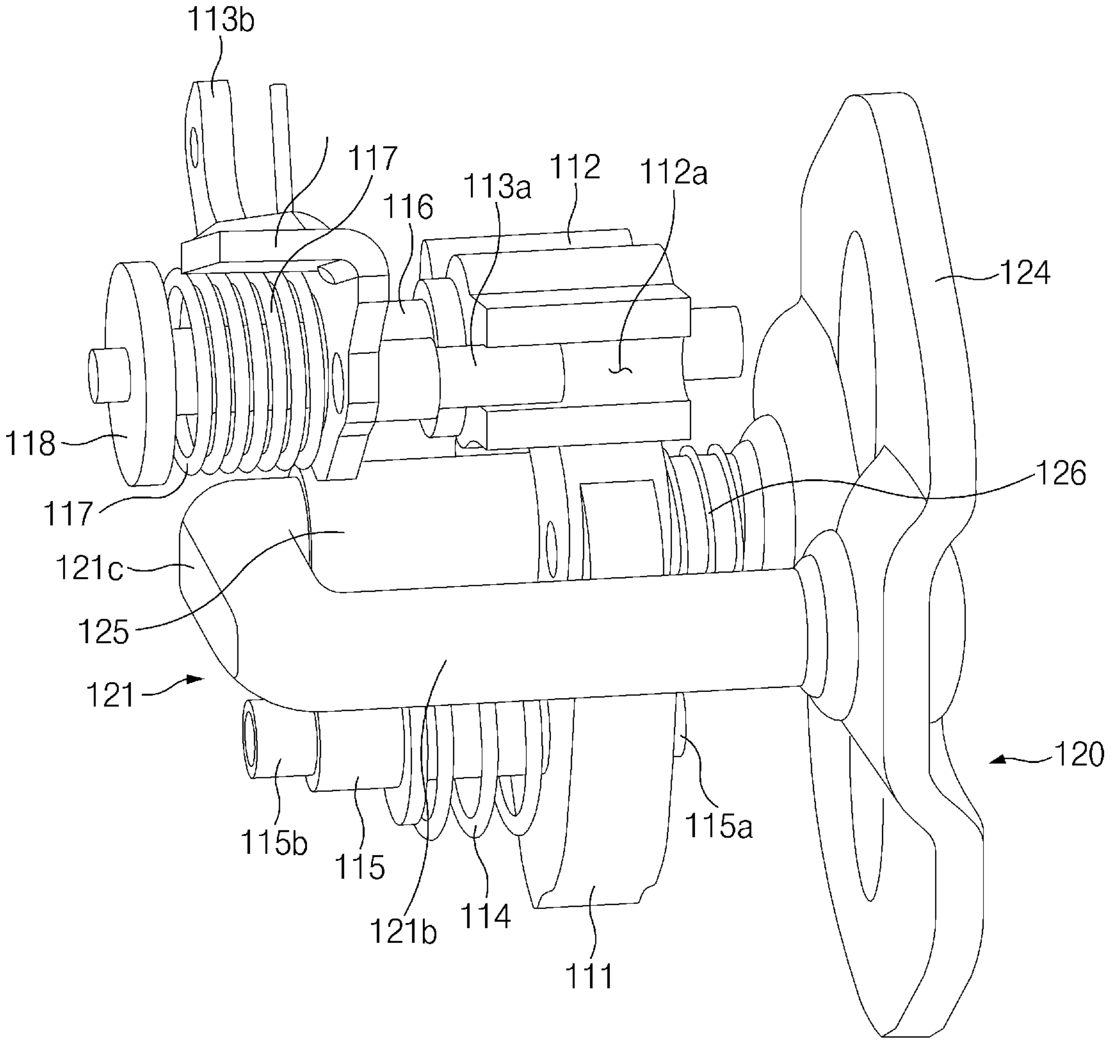
FIG. 29 illustrates a state in which a catch of a main latch moves toward a first end portion of a catch shaft, and a sleeve of a main striker moves away from a mounting plate in a vehicle door opening and closing apparatus according to an exemplary embodiment of the present disclosure.

Referring to FIG. 29, as the catch 111 locks the sleeve 125, the catch in may return to the position adjacent the first end portion 115*a* of the catch shaft 115 by the spring force of the spring 114, and the sleeve 125 may return to the position away from the mounting plate 124 by the spring force of the spring 126.

According to the exemplary embodiments illustrated in FIGS. 17 to 29, even when the vehicle door 5 is closed in the swing mode, the catch in may move along the longitudinal axis of the catch shaft 115 or the sleeve 125 may move along the longitudinal axis of the rod 121, thereby preventing the generation of abnormal noise, impacts, vibrations, and the like between the main latch 110 and the main striker 120, and preventing a reduction in durability.

FIGS. 1 to 29 illustrate the vehicle door opening and closing apparatus according to exemplary embodiments of the present disclosure applied to the rear door 5. However, the vehicle door opening and closing apparatus according to exemplary embodiments of the present disclosure may be applied to various vehicle doors, such as front doors, in addition to rear doors.

Figure 30:
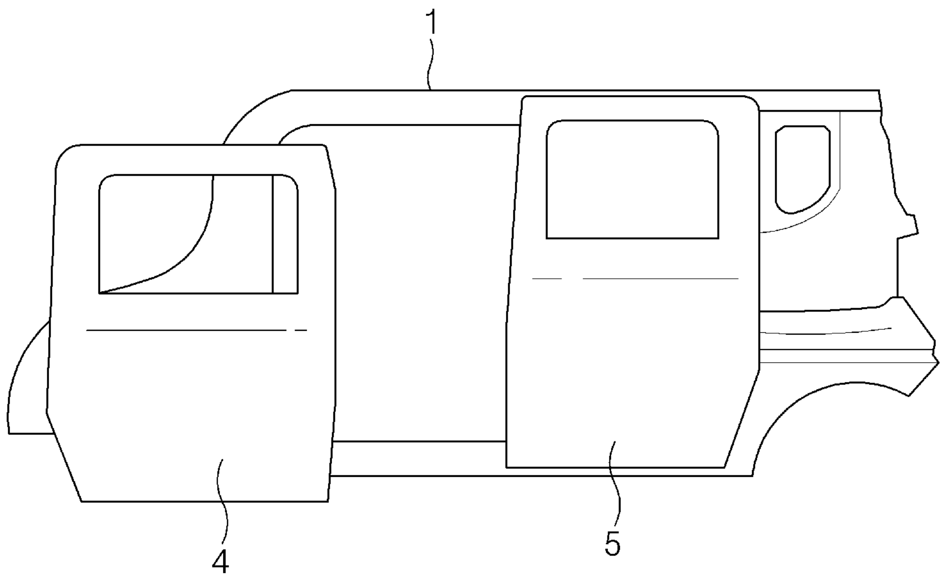
FIG. 30 illustrates a vehicle door opening and closing apparatus according to an exemplary embodiment of the present disclosure, which is applied to a front door of a vehicle, in a state in which the front door is opened in a sliding mode.
Figure 31:
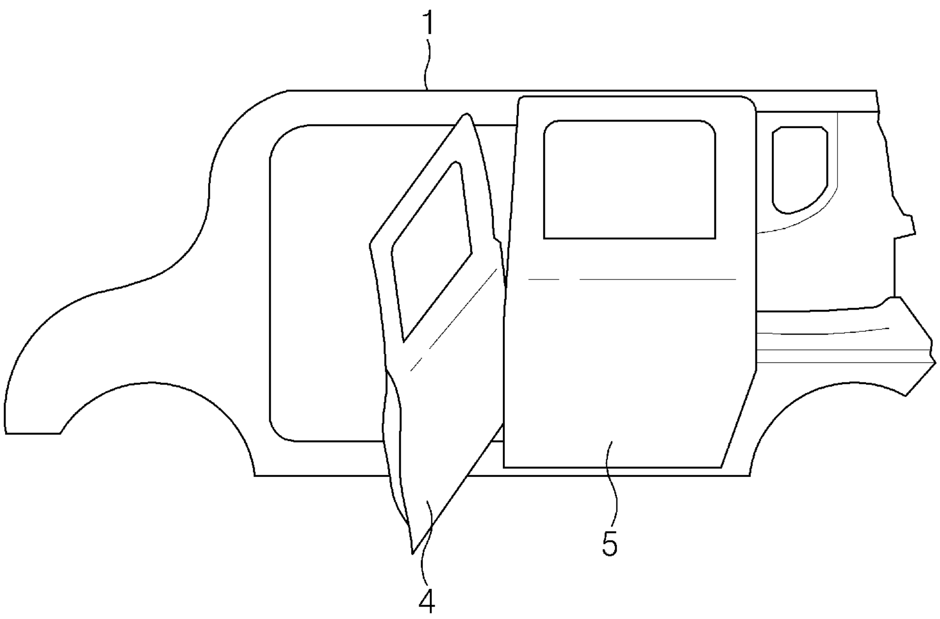
FIG. 31 illustrates a state in which the front door of FIG. 30 is opened in a swing mode.

FIGS. 30 and 31 illustrate the vehicle door opening and closing apparatus according to exemplary embodiments of the present disclosure applied to the front door 4. FIG. 30 illustrates a state in which the front door 4 is opened in the sliding mode, and FIG. 31 illustrates a state in which the front door 4 is opened in the swing mode.

Figure 32:
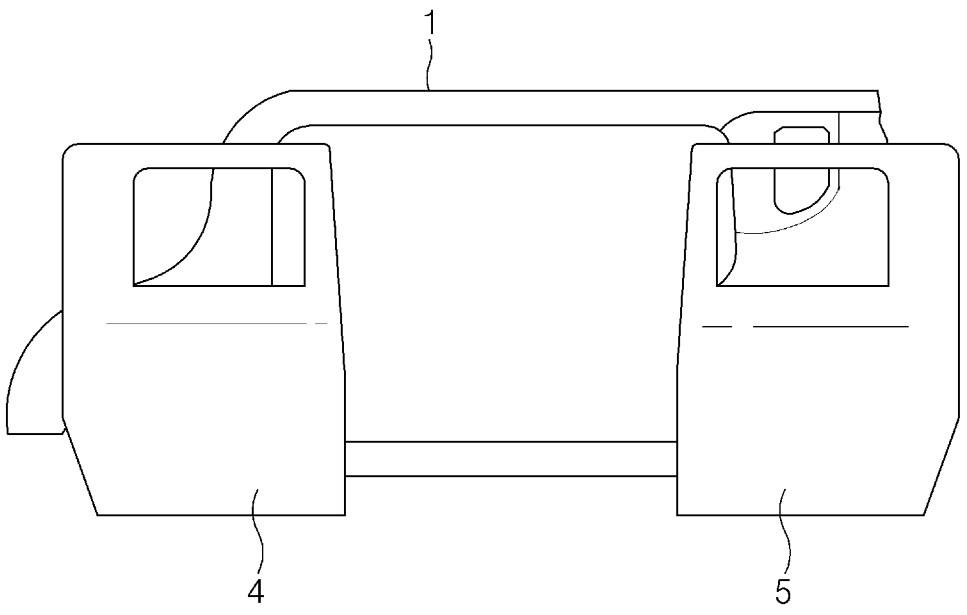
FIG. 32 illustrates a vehicle door opening and closing apparatus according to an exemplary embodiment of the present disclosure, which is applied to a front door and a rear door of a vehicle, in a state in which the front door and the rear door are opened in a sliding mode.
Figure 33:
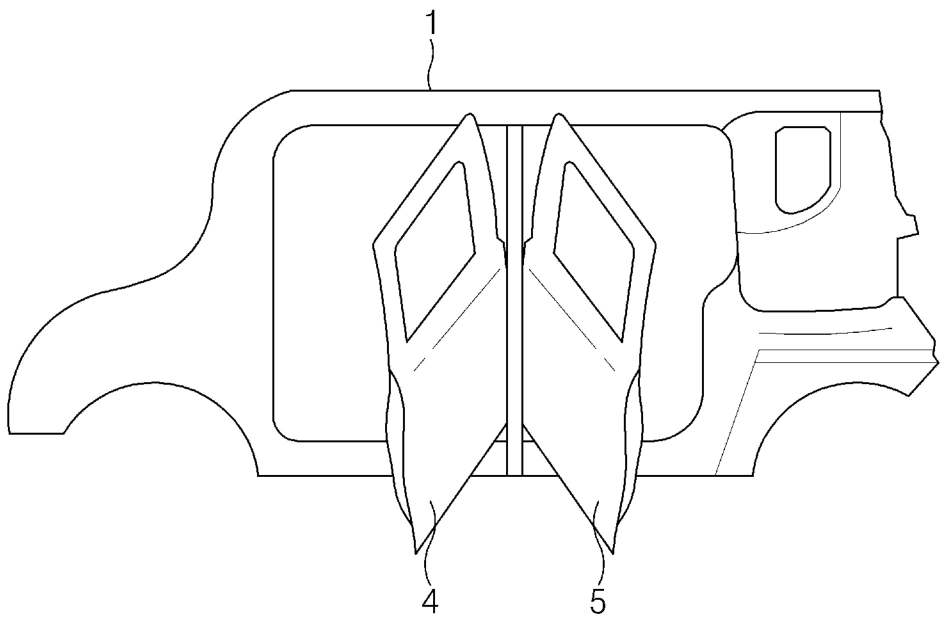
FIG. 33 illustrates a state in which the front door and the rear door of FIG. 32 are opened in a swing mode.

FIGS. 32 and 33 illustrate the vehicle door opening and closing apparatus according to exemplary embodiments of the present disclosure applied to both the front door 4 and the rear door 5. FIG. 32 illustrates a state in which the front door 4 and the rear door 5 are opened in the sliding mode, and FIG. 33 illustrates a state in which the front door 4 and the rear door 5 are opened in the swing mode.

As set forth above, the vehicle door opening and closing apparatus according to exemplary embodiments of the present disclosure may selectively switch the opening/closing operation of the vehicle door into the sliding mode and the swing mode, thereby meeting the needs of users such as convenience and diversity. By selecting the opening/closing operation of the vehicle door depending on the user's situation and environment, convenience and quality may be improved. In particular, the opening/closing operation of the vehicle door may be performed in any one mode selected from the sliding mode and the swing mode depending on the user's situation (location, time, purpose of use, etc.), environment (weather, season, etc.), the occupants' ages (children, adults, the elderly, etc.), and the like, and thus improved ease of use may be achieved. For example, when the vehicle is stopped on the roadside, the swing mode may be selected so that the occupants of all ages may quickly open and close the vehicle door with relatively little force. The sliding mode may be selected in a narrow space such as a parking lot so that a space for ingress and egress of the occupants may be relatively large, which enables quick ingress and egress of the occupants of all ages. The sliding mode may be selected for the ingress and egress of occupants such as small children, the elderly, and the disabled so that a relatively large space for ingress and egress may be provided to those vulnerable occupants. When vehicles are used for camping, loading freight/cargo, etc., the sliding mode may be selected to improve ease of use.

According to exemplary embodiments of the present disclosure, when the vehicle door is closed, the contact portion between the catch of the main latch and the rod of the main striker may be configured to slide. Accordingly, even when the vehicle door is closed in any one mode of the swing mode and the sliding mode, abnormal noise, impacts, vibrations, and the like may not be generated, and a reduction in durability may be prevented.

In terms of vehicle specifications, the vehicle door opening and closing structure may be standardized, regardless of vehicle models. Thus, the manufacturing cost and investment cost may be significantly reduced.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A vehicle door opening and closing apparatus, comprising:
- a main latch including a catch configured to rotate around a catch shaft; and
- a main striker including a rod,
- wherein:
  - the main latch is configured to be coupled to a vehicle door of a vehicle;
  - the main striker is configured to be coupled to a vehicle body of the vehicle;
  - the rod is configured to:
    - enter a slot of the catch as the vehicle door is closed; and
    - exit the slot as the vehicle door is opened;
  - the catch shaft comprises:
    - a first end portion facing a door frame portion of the vehicle body when the vehicle door is closed; and
    - a second end portion facing an interior of the vehicle door,
  - the catch is biased toward the first end portion of the catch shaft by a spring, and
  - the catch is configured to move along a longitudinal axis of the catch shaft, such that, when the vehicle door is closed, the rod of the main striker pushes the catch of the main latch toward the second end portion of the catch shaft.

2. The vehicle door opening and closing apparatus according to claim 1, wherein the vehicle door is configured to be opened and closed selectively in either a sliding mode or a swing mode.

3. The vehicle door opening and closing apparatus according to claim 1, wherein:
- the catch shaft has a support wall spaced apart from the catch, and
- the spring is located between the catch and the support wall.

4. The vehicle door opening and closing apparatus according to claim 1, wherein:
- the main latch further includes a pawl operatively connected to the catch, and
- the pawl has a width corresponding to a distance the catch can move along the longitudinal axis of the catch shaft.

5. The vehicle door opening and closing apparatus according to claim 4, wherein the catch is configured to continuously contact the pawl while the catch is moving.

6. The vehicle door opening and closing apparatus according to claim 4, wherein:
- the pawl is configured to rotate around a pawl shaft, and
- a longitudinal axis of the pawl shaft is parallel to the longitudinal axis of the catch shaft.

7. The vehicle door opening and closing apparatus according to claim 6, wherein:
- the main latch further includes a pawl stopper operatively connected to the pawl,
- the pawl has a recess, and
- the pawl stopper has a pin configured to be received in the recess of the pawl.

8. The vehicle door opening and closing apparatus according to claim 7, wherein the recess of the pawl extends in a longitudinal direction of the pawl shaft.

9. The vehicle door opening and closing apparatus according to claim 7, wherein the pawl stopper is configured to rotate around the pawl shaft.

10. The vehicle door opening and closing apparatus according to claim 1, wherein:
- the main striker further includes a mounting plate mounted on the vehicle body,
- a sleeve is configured to move along a longitudinal axis of the rod, and
- the rod extends from the mounting plate.

11. The vehicle door opening and closing apparatus according to claim 10, wherein the sleeve is oriented toward a position away from the mounting plate by a second spring.

12. The vehicle door opening and closing apparatus according to claim 10, wherein:
- the rod includes two leg portions and a bridge portion connecting the two leg portions, and
- the sleeve is movably mounted on one leg portion of the two leg portions.

13. The vehicle door opening and closing apparatus according to claim 12, wherein the sleeve is configured to rotate around the one leg portion.

14. A vehicle door apparatus, comprising:
- a vehicle door of a vehicle, wherein the vehicle door is capable of being opened and closed in both a sliding mode and a swing mode;
- a main latch including a catch configured to rotate around a catch shaft, wherein:
  - the main latch is configured to be coupled to the vehicle door, and
  - the catch is configured to move along a longitudinal axis of the catch shaft; and
- a main striker comprising:
  - a rod; and
  - a sleeve,
  - wherein:
    - the main striker is configured to be coupled to a vehicle body of the vehicle,
    - the rod is configured to:
      - enter a slot of the catch as the vehicle door is closed; and
      - exit the slot as the vehicle door is opened, and
    - the sleeve is configured to move along a longitudinal axis of the rod, wherein:
  - the catch is configured to move in a first direction along the catch shaft when the vehicle door is closed,
  - the sleeve is configured to move in a second direction along the rod when the vehicle door is closed,
  - the first direction and the second direction are opposite directions,
  - the catch shaft comprises:
    - a first end portion facing a door frame portion of the vehicle body when the vehicle door is closed; and
    - a second end portion facing an interior of the vehicle door,
  - the catch is biased toward the first end portion of the catch shaft by a spring, and
  - the catch is configured to move along the longitudinal axis of the catch shaft, such that, when the vehicle door is closed, the rod of the main striker pushes the catch of the main latch toward the second end portion of the catch shaft.

15. The vehicle door apparatus according to claim 14, wherein the sleeve is configured to move in the first direction along the rod after the vehicle door is closed.

16. The vehicle door apparatus according to claim 15, wherein the catch is configured to move in the second direction along the catch shaft after the vehicle door is closed.

17. The vehicle door apparatus according to claim 14, wherein:

the main latch further includes a pawl operatively connected to the catch, the pawl has a width corresponding to a moving distance of the catch, and the catch is configured to continuously contact the pawl while the catch is moving.

18. The vehicle door apparatus according to claim 14, wherein:

the rod includes two leg portions and a bridge portion connecting the two leg portions, and the sleeve is movably mounted on any one leg portion of the two leg portions.

* * * * *